(12) United States Patent
Tsuchiya et al.

(10) Patent No.: US 11,039,066 B2
(45) Date of Patent: Jun. 15, 2021

(54) IMAGE PICKUP APPARATUS HAVING A PLURALITY OF SETTABLE IMAGE CAPTURING MODES, METHOD FOR CONTROLLING THE SAME, AND NON-TRANSITORY COMPUTER-READABLE STORAGE MEDIUM

(71) Applicant: CANON KABUSHIKI KAISHA, Tokyo (JP)

(72) Inventors: Takuo Tsuchiya, Sagamihara (JP); Yukihiro Matsumoto, Kawaguchi (JP); Yuki Fukushima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 56 days.

(21) Appl. No.: 16/451,692

(22) Filed: Jun. 25, 2019

(65) Prior Publication Data
US 2020/0007756 A1    Jan. 2, 2020

(30) Foreign Application Priority Data

Jun. 28, 2018 (JP) .............................. JP2018-123741
Jun. 28, 2018 (JP) .............................. JP2018-123742
(Continued)

(51) Int. Cl.
H04N 5/232    (2006.01)
H04N 5/235    (2006.01)

(52) U.S. Cl.
CPC ....... *H04N 5/23229* (2013.01); *H04N 5/2353* (2013.01); *H04N 5/23245* (2013.01)

(58) Field of Classification Search
CPC ........... H04N 5/23229; H04N 5/23245; H04N 5/2353; H04N 5/232933; H04N 5/2352; H04N 5/238; G03B 7/01
See application file for complete search history.

(56) References Cited

U.S. PATENT DOCUMENTS

2005/0157206 A1*  7/2005  Kato .................... H04N 5/2354
                                                            348/370
2008/0285967 A1   11/2008  Yamanaka
(Continued)

FOREIGN PATENT DOCUMENTS

CN      1087181 A    5/1994
CN      1738366 A    2/2006
(Continued)

OTHER PUBLICATIONS

Shenzhen; "Automatization of Manual Exposal Machine and Automate the Photo Imaging Process," Shenzhen Fast-Print Circuit Technology Co.,Ltd.; Printed Circuit Information; Feb. 10, 2005; pp. 1-4.

*Primary Examiner* — Mekonnen D Dagnew
(74) *Attorney, Agent, or Firm* — Canon U.S.A., Inc. IP Division

(57) ABSTRACT

There is provided an image pickup apparatus including a plurality of image capturing modes which is changeable by a user operation of a first operation member. In a first mode, an exposure control value is to be chosen and set to a fixed value by the user, and others are set to settable automatic exposure control values by the image pickup apparatus without the user's operation. In a second mode, the plurality of exposure control values are all to be set to the automatic values. In a third mode, the plurality of exposure control values are settable to a combination of the automatic value and fixed value settable in the first and the second mode by user via a second operation member, without changing the image capturing mode.

19 Claims, 16 Drawing Sheets

(30) Foreign Application Priority Data

Jun. 28, 2018 (JP) .............................. JP2018-123743
Apr. 15, 2019 (JP) .............................. JP2019-077388

(56) References Cited

U.S. PATENT DOCUMENTS

| | | | |
|---|---|---|---|
| 2011/0249142 A1 | 10/2011 | Brunner | |
| 2012/0095354 A1 | 4/2012 | Dunn | |
| 2013/0314568 A1* | 11/2013 | Vranceanu | G06T 5/40 348/239 |
| 2015/0350533 A1* | 12/2015 | Harris | H04N 5/2355 348/362 |
| 2018/0350106 A1* | 12/2018 | Kasilya Sudarsan | H04N 5/232939 |
| 2019/0109982 A1 | 4/2019 | Izaki | |

FOREIGN PATENT DOCUMENTS

| | | |
|---|---|---|
| CN | 101634795 A | 1/2010 |
| CN | 106416222 A | 2/2017 |
| CN | 106454145 A | 2/2017 |
| CN | 107018300 A | 8/2017 |
| CN | 108076285 A | 5/2018 |
| CN | 108206920 A | 6/2018 |
| JP | 10-42187 A | 2/1998 |
| JP | 2011-19019 A | 1/2011 |

\* cited by examiner

FIG.4A

| SHUTTER SPEED | 1/125 |
| APERTURE VALUE | F4.0 |
| ISO SENSITIVITY | ISO100 |

FIG.4B

| SHUTTER SPEED | 1/125 | AUTO |
| APERTURE VALUE | F4.0 | AUTO |
| ISO SENSITIVITY | ISO100 | AUTO |

FIG.4C

| SHUTTER SPEED | ◎ 1/125 |
| APERTURE VALUE | F4.0 |
| SHUTTER SPEED | ISO100 |

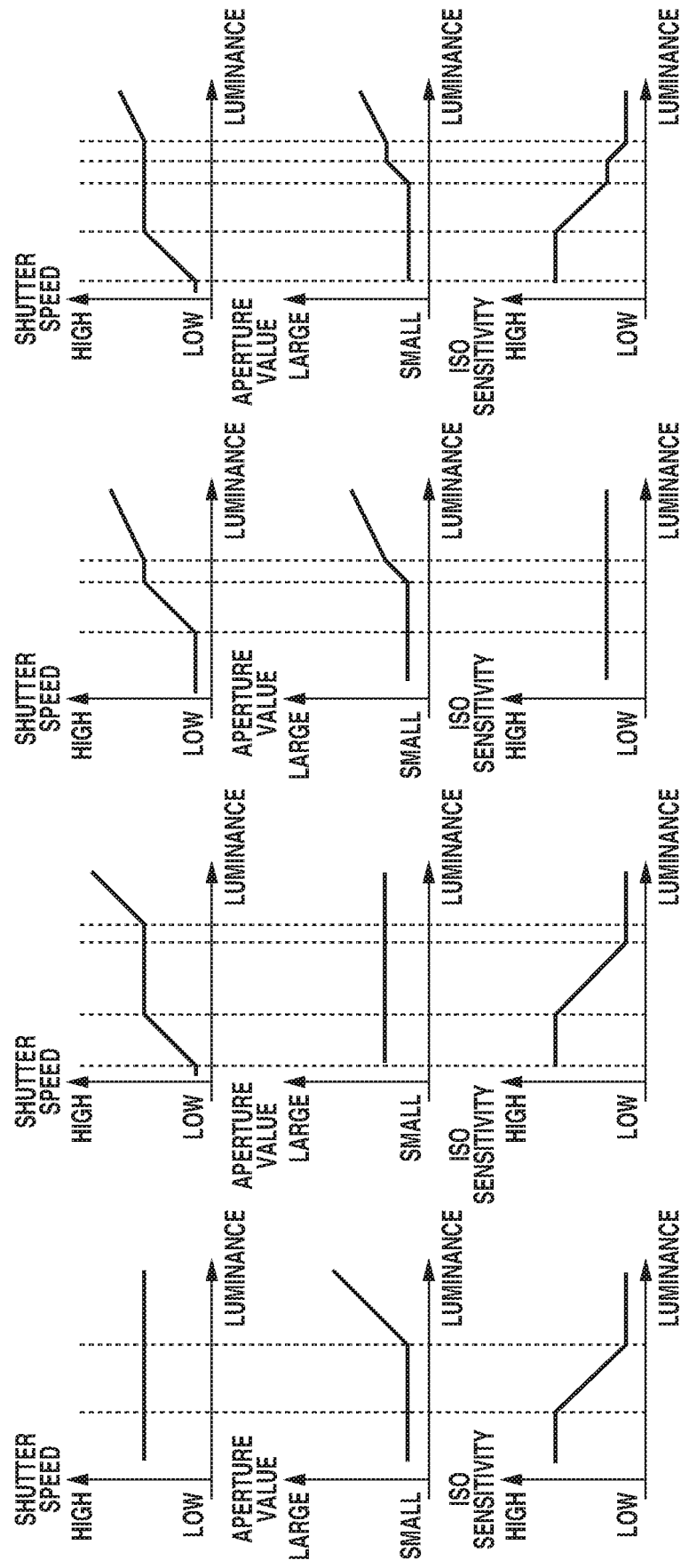
FIG.5A SHUTTER SPEED PRIORITY
FIG.5B APERTURE VALUE PRIORITY
FIG.5C ISO SENSITIVITY PRIORITY
FIG.5D FULL-AUTOMATIC

FIG.7A
EQUIVALENT TO FULL-AUTOMATIC MODE
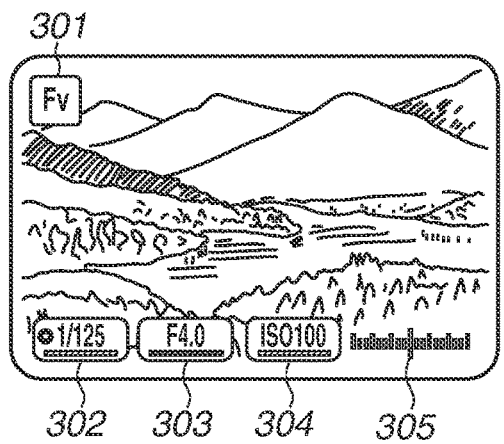
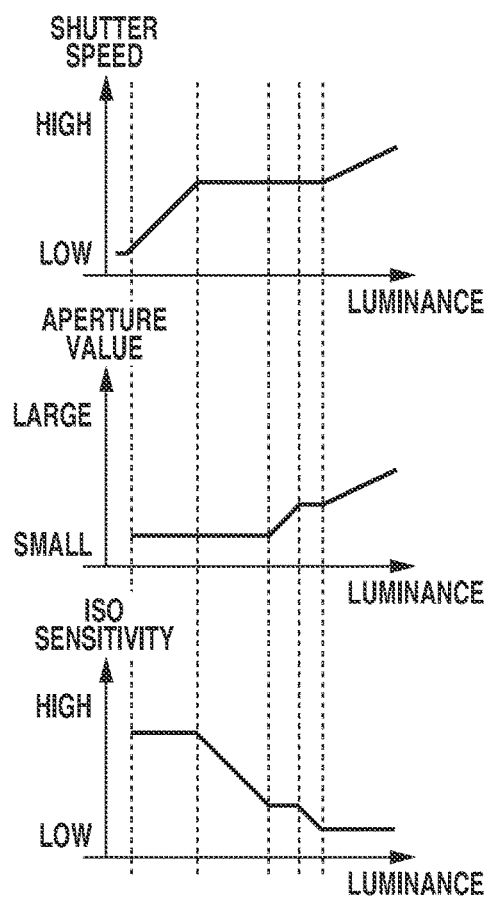
FIG.7B
EQUIVALENT TO SHUTTER SPEED PRIORITY MODE
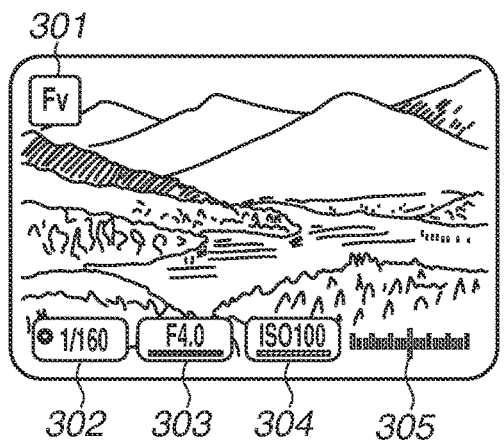
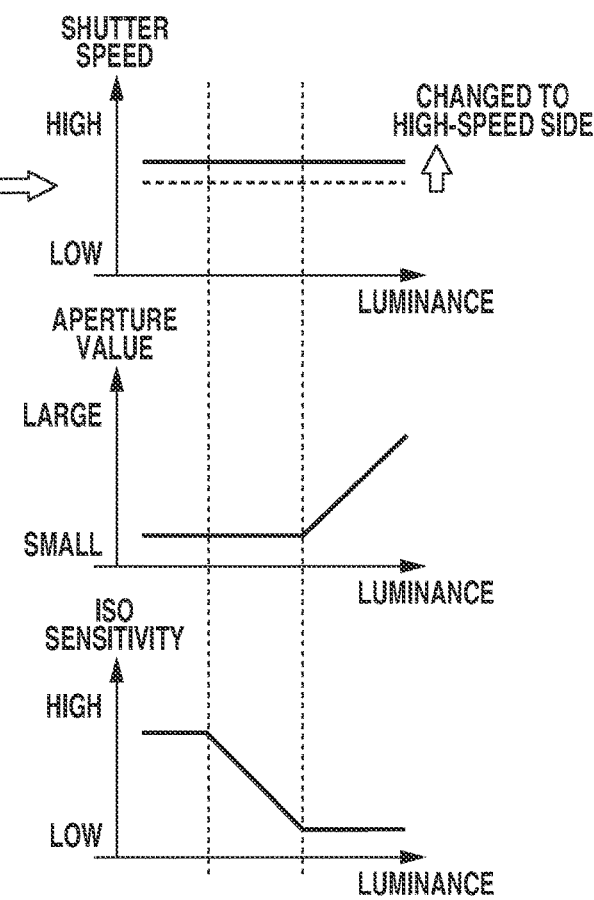

FIG.8

FIRST IMAGE PICKUP

| SHUTTER SPEED | 1/125 |
| APERTURE VALUE | F4.0 |
| ISO SENSITIVITY | ISO100 |

SECOND IMAGE PICKUP

| SHUTTER SPEED | 1/125 |
| APERTURE VALUE | F4.0 |
| ISO SENSITIVITY | ISO200 |

THIRD IMAGE PICKUP

| SHUTTER SPEED | 1/125 |
| APERTURE VALUE | F5.6 |
| ISO SENSITIVITY | ISO100 |

FIG.10

FIRST IMAGE PICKUP

SHUTTER SPEED — 1/125

APERTURE VALUE — F4.0

ISO SENSITIVITY — ISO200

SECOND IMAGE PICKUP

SHUTTER SPEED — 1/125

APERTURE VALUE — F4.0

ISO SENSITIVITY — ISO100

THIRD IMAGE PICKUP

SHUTTER SPEED — 1/125

APERTURE VALUE — F4.0

ISO SENSITIVITY — ISO400

IMAGE PICKUP APPARATUS HAVING A PLURALITY OF SETTABLE IMAGE CAPTURING MODES, METHOD FOR CONTROLLING THE SAME, AND NON-TRANSITORY COMPUTER-READABLE STORAGE MEDIUM

BACKGROUND OF THE INVENTION

Field of the Invention

The present invention relates to exposure control for an image pickup apparatus having a plurality of settable image capturing modes, and more particularly to a method for controlling exposure control values.

Description of the Related Art

A conventional image pickup apparatus is capable of setting a plurality of image capturing modes having a different exposure control value to be given priority from among a plurality of exposure control values (parameters) which are exposure elements for determining the image capturing exposure. Examples of image capturing modes include a shutter-speed priority mode in which priority is given to the shutter speed, and an aperture-value priority mode in which priority is given to the aperture value. In these image capturing modes, parameters other than the exposure control values set by a user are automatically determined by the image pickup apparatus. Many image pickup apparatuses are provided with a full-automatic image capturing mode in which all of the exposure control values are automatically set.

Therefore, in a conventional image pick up apparatus, by switching between image capturing modes, selection can be made between the user determining the changes to be made to the plurality of exposure control values and the image pickup apparatus determining the same. In this configuration, for example, when the user wants to reduce blur of a subject in an image, the user determines an arbitrary shutter speed and the image pickup apparatus determines other exposure control values, thus achieving an optimal exposure setting, in the shutter-speed priority mode. In a case where the user does not know the exposure control value to be changed according to a target scene, the image pickup apparatus can determine the exposure control values according to the luminance value of the subject in the full-automatic mode.

However, in the full-automatic mode, the image pickup apparatus automatically determines the image capturing exposure, which makes it difficult to reflect the user's intention. To change a combination of the exposure control values determined by the user and the exposure control values determined by the image pickup apparatus, it is necessary to change the image capturing mode, resulting in complicated user operations. For example, if the depth of field desired by the user cannot be obtained with the aperture value set by the image pickup apparatus in the full-automatic mode, the user needs to change the image capturing mode to the aperture-value priority mode and then manually adjust the aperture value.

Japanese Patent Application Laid-Open No. 2011-19019 discusses a technique in which an image pickup apparatus recognizes subject conditions and changes the current image capturing mode to another image capturing mode associated with the current image capturing mode.

Japanese Patent Application Laid-Open No. 10-42187 discusses a technique for saving time and effort for manually adjusting pre-imaging settings when a user changes the image capturing mode, by carrying over the pre-imaging settings to the image capturing mode selected.

SUMMARY OF THE INVENTION

The present invention is directed to an image pickup apparatus having a plurality of image capturing modes each providing a different method for controlling a plurality of exposure control values to change the exposure when capturing an image of a subject to acquire an image signal, the image pickup apparatus comprising an image pickup unit, and at least one processor or circuit configured to perform the operations of the following units, a first control unit configured to control transitions between the plurality of image capturing modes actuated by a manual user operation, using a first operation member, and a second control unit configured to control changes to the plurality of exposure control values by a manual user operation, using a second operation member, wherein the plurality of image capturing modes at least including a first mode, a second mode, and a third mode wherein the first mode in which an exposure control value from among the plurality of exposure control values is to be chosen and set to a fixed value by the user, and other exposure control values are set to settable automatic values by the image pickup apparatus without involving a change operation by the user, wherein the second mode in which the plurality of exposure control values are all set to the automatic values, and wherein the third mode in which the plurality of exposure control values are settable to a combination of the automatic value and the fixed value settable in the first and the second modes by the user via the second operation member, without changing the image capturing mode.

Further features of the present invention will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

BRIEF DESCRIPTION OF THE DRAWINGS

FIGS. 4A, 4B, and 4C illustrate methods for displaying the exposure control values according to the first exemplary embodiment of the present invention.

FIGS. 5A, 5B, 5C, and 5D illustrate examples of program diagrams according to exposure control settable by the image pickup apparatus according to the first exemplary embodiment of the present invention.

FIGS. 7A and 7B illustrates examples of program diagram transitions in the semi-automatic mode according to the first exemplary embodiment of the present invention.

FIG. 8 illustrates examples of exposure control value changes at the time of auto bracketing in a shutter-speed priority mode according to the first exemplary embodiment of the present invention.

FIG. 10 illustrates examples of exposure control value changes at the time of high dynamic range (HDR) image capturing in the shutter-speed priority mode according to the first exemplary embodiment of the present invention.

DESCRIPTION OF THE EMBODIMENTS (Basic Configuration of Image Pickup Apparatus 100)

Figure 1A:
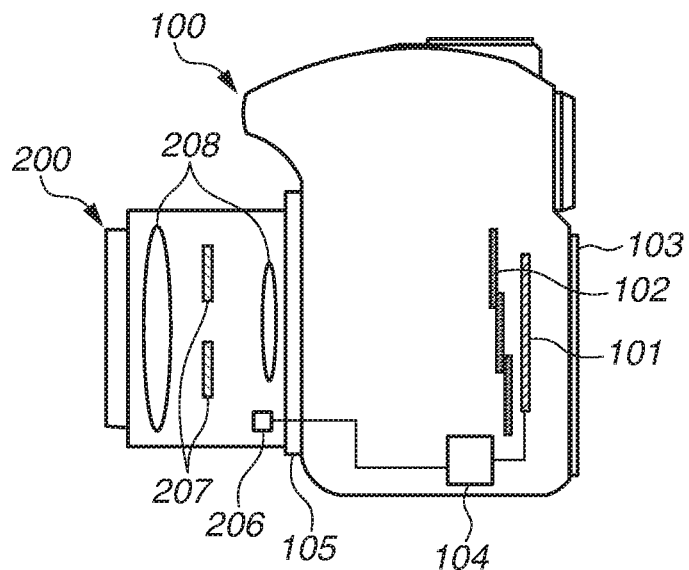
FIGS. 1A, 1B, and 1C illustrate a configuration of an image pickup apparatus according to a first exemplary embodiment of the present invention.
Figure 1B:
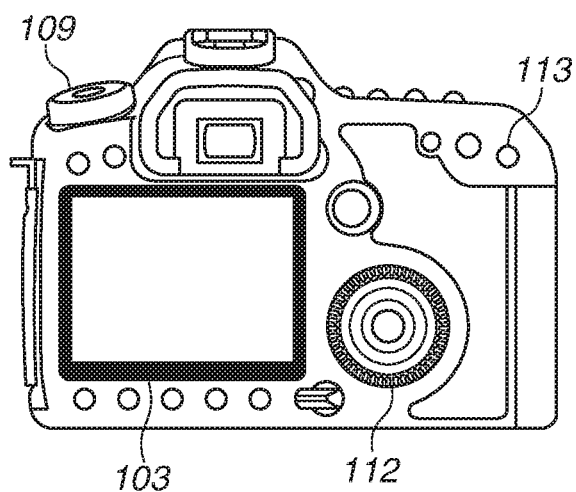
Figure 1C:
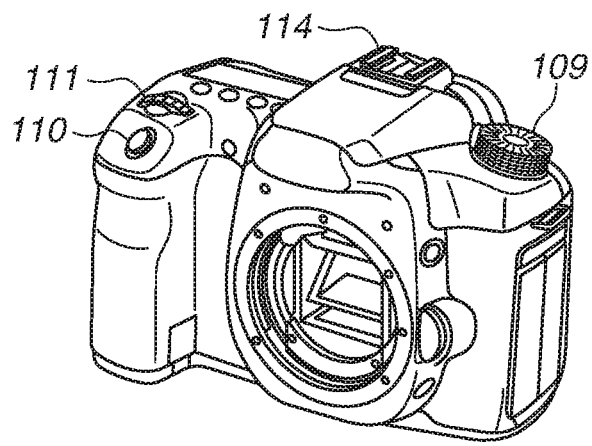
Figure 2:
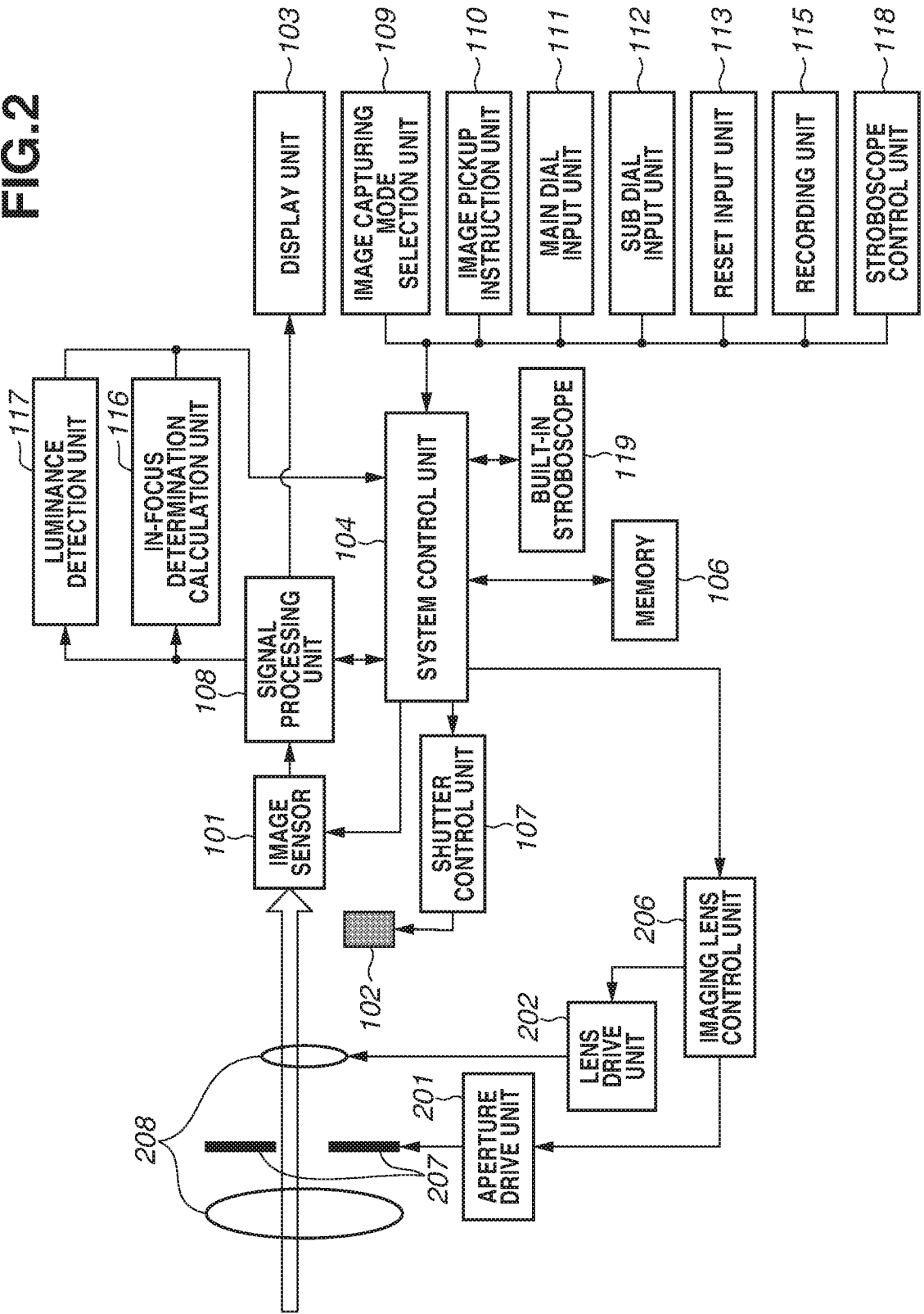
FIG. 2 is a block diagram illustrating an example of a configuration of the image pickup apparatus according to the first exemplary embodiment of the present invention.

Preferable exemplary embodiments of the present invention will be described below with reference to the accompanying drawings. FIGS. 1A, 1B, and 1C illustrate a configuration of an image pickup apparatus 100 as an image pickup apparatus according to a first exemplary embodiment of the present invention. FIG. 1A is a schematic sectional view illustrating the image pickup apparatus 100. FIG. 1B is a rear view illustrating the image pickup apparatus 100. FIG. 1C is a bird's-eye view illustrating the image pickup apparatus 100. FIG. 2 is a block diagram illustrating an example of a configuration of the image pickup apparatus 100 as an image pickup apparatus according to the first exemplary embodiment of the present invention. One or more function blocks illustrated in FIG. 2 may be implemented by hardware such as an application specific integrated circuit (ASIC) and a programmable logic array (PLA) or implemented when a programmable processor such as a central processing unit (CPU) and a microprocessing unit (MPU) executes software. In addition, the function blocks may be implemented by a combination of software and hardware. Therefore, in the following descriptions, even if different function blocks are described as operating entities, these function blocks are implementable by the same hardware entity.

The image pickup apparatus 100 is electrically connectable with an interchangeable lens 200 via a mount contact 105 provided on a mounting portion. The mounting portion provided on the image pickup apparatus 100 has a bayonet claw group (not illustrated) and is connectable with the bayonet claw group (not illustrated) provided on the mounting portion of the interchangeable lens 200 through a bayonet connection method. In this configuration, camera accessories including the interchangeable lens 200 can be detachably attached to the image pickup apparatus 100.

The interchangeable lens 200 condenses a light flux from a subject via a lens group 208 and guides the light flux to an image sensor 101 provided inside the image pickup apparatus 100. The image sensor 101 is an image pickup unit employing a charge accumulation type solid-state image sensor such as a complementary metal oxide semiconductor (CMOS) sensor capable of converting the light flux of a subject received from the interchangeable lens 200 into an electrical image signal. The image pickup apparatus 100 is capable of changing the sensitivity (light receiving sensitivity) at the time of converting an optical image corresponding to the light flux of the subject into an electrical signal. The brightness of an image signal can be adjusted by adjusting the light receiving sensitivity and the amount of digital gain after the conversion into an image signal. According to the present exemplary embodiment, these quantities are collectively referred to as an imaging sensitivity. The image pickup apparatus 100 is capable of adjusting the imaging sensitivity by changing the International Standard Organization (ISO) sensitivity.

A shutter 102 is a light shielding member disposed on the anterior side of the image sensor 101 on the optical path of the light flux guided by the lens group 208. The shutter 102 includes a blade member. In a state where the blade member is expanded, the light flux from the subject can be intercepted. In a state where the blade member is folded, an optical image corresponding to the light flux from the subject focused on the image sensor 101 can be formed on the image sensor 101. The image pickup apparatus 100 enables the user to adjust the amount of light incident to the image sensor 101 according to the running speed of the shutter 102. The brightness of the image signal can be adjusted by changing the shutter speed as an exposure condition based on the running speed of the shutter 102 and the exposure time of the image sensor 101. As a configuration for performing a similar operation to the shutter 102, an electronic shutter operating through accumulation control in the image sensor 101 may be employed.

The interchangeable lens 200 includes an imaging lens control unit 206 capable of changing the stop amount (aperture value) related to the aperture diameter of an aperture 207 provided inside the interchangeable lens 200. Adjusting the stop amount of the aperture 207 enables adjusting the light amount incident to the inside of the image pickup apparatus 100. The imaging lens control unit 206 can control the positions of lenses (including a focal lens, a zoom lens, and a shift lens) constituting the lens group 208.

A system control unit 104 (described below) and the imaging lens control unit 206 are electrically connected with each other via the mount contact 105. The system control unit 104 can issue various types of instructions for various operations of the aperture 207 and the lens group 208 of the interchangeable lens 200 via the imaging lens control unit 206.

The system control unit 104 comprehensively controls the image pickup apparatus 100 and each unit of camera accessories attached to the image pickup apparatus 100 and includes a microcomputer (CPU) (not illustrated). The contents of control performed by the system control unit 104 will be described in detail below in the descriptions of various operations.

A memory 106 is a recording medium capable of recording data related to operations of the image pickup apparatus 100 and various types of data acquired by using the image pickup apparatus 100. The memory 106 according to the present exemplary embodiment includes a read only memory (ROM) area as a nonvolatile memory and a random access memory (RAM) area as a volatile memory.

A display unit 103 includes a thin-film transistor drive type liquid crystal display unit (TFT type LCD) capable of displaying a display image signal based on an image signal acquired by the image sensor 101. The display unit 103 is capable of displaying a menu including imaging parameters such as the aperture value, shutter speed, ISO sensitivity, and other exposure control values for adjusting the image capturing exposure and the brightness of the image signal. The display unit 103 is a touch panel which also serves as an operation unit enabling user touch operations. According to the present exemplary embodiment, the display unit 103 functions as a capacitance touch panel. The configuration of the display unit 103 enabling touch operations is not limited to one employing capacitance detection, and any known methods are applicable.

An image capturing mode selection unit 109 allows a user to select one of image capturing modes settable on the image pickup apparatus 100. The image capturing modes according to the present exemplary embodiment are modes providing different methods for setting the above-described exposure control values. Examples of settable image capturing modes include an aperture-value (Av) priority mode for preferentially setting the aperture value, a shutter-speed (Tv) priority mode for preferentially setting the shutter speed, and a semi-automatic mode for automatically and manually setting the exposure control values and exposure correction amount to arbitrary values. The image capturing mode selection unit 109 is electrically connected with the system control unit 104 which controls the image pickup apparatus 100 according to the image capturing mode selected via the image capturing mode selection unit 109.

In the semi-automatic mode, the user can freely set, without changing the image capturing mode, combinations of fixed exposure control values (fixed values) manually set in response to an input of a user operation, and exposure control values (automatic values) settable by the image pickup apparatus 100 not through a user change operation.

An image pickup instruction unit 110 is electrically connected with the system control unit 104. When the user manually presses the image pickup instruction unit 110, a signal is enabled to issue an image-pickup preparation instruction and an image pickup instruction. In other states, the signal is disabled. The image pickup instruction unit 110 changes in two steps of the depression state. The system control unit 104 recognizes the half-press state of the image pickup instruction unit 110 as an image pickup standby state, and instructs each unit of the image pickup apparatus 100 to perform an image-pickup preparation operation. The system control unit 104 recognizes the full-press state of the image pickup instruction unit 110 as an image pickup state, and instructs each unit of the image pickup apparatus 100 to perform an image pickup operation.

A main dial input unit 111 is rotatable without an end in the rotational direction and is capable of acquiring the amount of rotation corresponding to a user operation as an input amount for a predetermined operation. A sub dial input unit 112 is rotatable without an end in the rotational direction and is capable of acquiring the amount of rotation according to a user operation as an input amount for a predetermined operation. The main dial input unit 111 and the sub dial input unit 112 are electrically connected with the system control unit 104. An operation input according to the amount of rotation is controlled by the system control unit 104. A reset input unit 113 is a button type input unit. The user can manually press the buttons. When the user operates the reset input unit 113, the system control unit 104 controls a predetermined operation corresponding to the operation (reset input). An accessory connection unit 114 is used to attach an accessory such as an external stroboscope and microphone (not illustrated) to the camera and control the accessory from the camera. The accessory connection unit 114 is electrically connected with the system control unit 104. The attached accessory can be controlled from the system control unit 104.

An aperture drive unit 201 is a component for moving the aperture 207 of the interchangeable lens 200. More specifically, the aperture drive unit 201 drives the aperture 207 to the aperture position specified by the imaging lens control unit 206 to adjust the opening of the aperture 207 to the open area amount corresponding to the aperture value. A lens drive unit 202 is a component for driving the lens group 208 of the interchangeable lens 200 to a predetermined position, i.e., the position specified by the imaging lens control unit 206.

A shutter control unit 107 is component for controlling the opening/closing state of the shutter 102. Controlling the running of the shutter 102 in the time period specified by the system control unit 104 enables controlling the shutter speed when capturing an image of a subject. A signal processing unit 108 is a component for performing various types of processing on the image signal output from the image sensor 101. More specifically, the signal processing unit 108 performs predetermined image interpolation, resizing processing such as reduction, color conversion processing, and processing for calculating the amount of pixel data including saturated pixels and underexposure pixels on digital image data. The signal processing unit 108 is a processing unit for performing white balance (hereinafter simply referred to as WB) processing and other calculation processing on digital image data. A recording unit 115 is a recording medium for recording the image signal acquired in image pickup, capable of recording the image signal acquired by using the image sensor 101 as still image data or video data.

An in-focus determination calculation unit 116 is a portion for calculating information for determining whether the lens position of the focal lens included in the interchangeable lens 200 is in the in-focus state based on the image signal output from the signal processing unit 108. If the current lens position is determined to be in the out-of-focus state based on the calculated information, the system control unit 104 controls the interchangeable lens 200 via the imaging lens control unit 206. Regardless of the in-focus state, the position of the focal lens can be adjusted under the control of the system control unit 104 in response to an input of a user operation.

A luminance detection unit 117 detects the brightness (luminance value) of the subject based on the image signal output from the signal processing unit 108. More specifically, the luminance detection unit 117 divides one screen corresponding to the acquired image signal into a plurality of blocks and calculates the average luminance value for each block. Then, the luminance detection unit 117 integrates the average luminance value of each block to acquire the representative luminance value. In the subsequent descriptions, the representative luminance value is regarded as the luminance value of the subject, and the luminance value is used for various types of processing and control such as exposure control. The method for detecting the luminance value is not limited thereto, and various types of methods related to the luminance value calculation are applicable. The system control unit 104 calculates the exposure control amounts of various exposure control values (shutter speed, aperture value, ISO sensitivity, etc.) based on the luminance value detected by the luminance detection unit 117 and the image capturing mode selected by the image capturing mode selection unit 109.

When the system control unit 104 determines that the light emission on the subject is required through light emission determination based on the light emission value, the stroboscope control unit 118 performs light emission control on a light emission unit in response to a user manual operation. The light emission unit according to the present exemplary embodiment is a built-in stroboscope 119 built in the image pickup apparatus 100 and the external stroboscope connected to the accessory connection unit 114.

Figure 3:
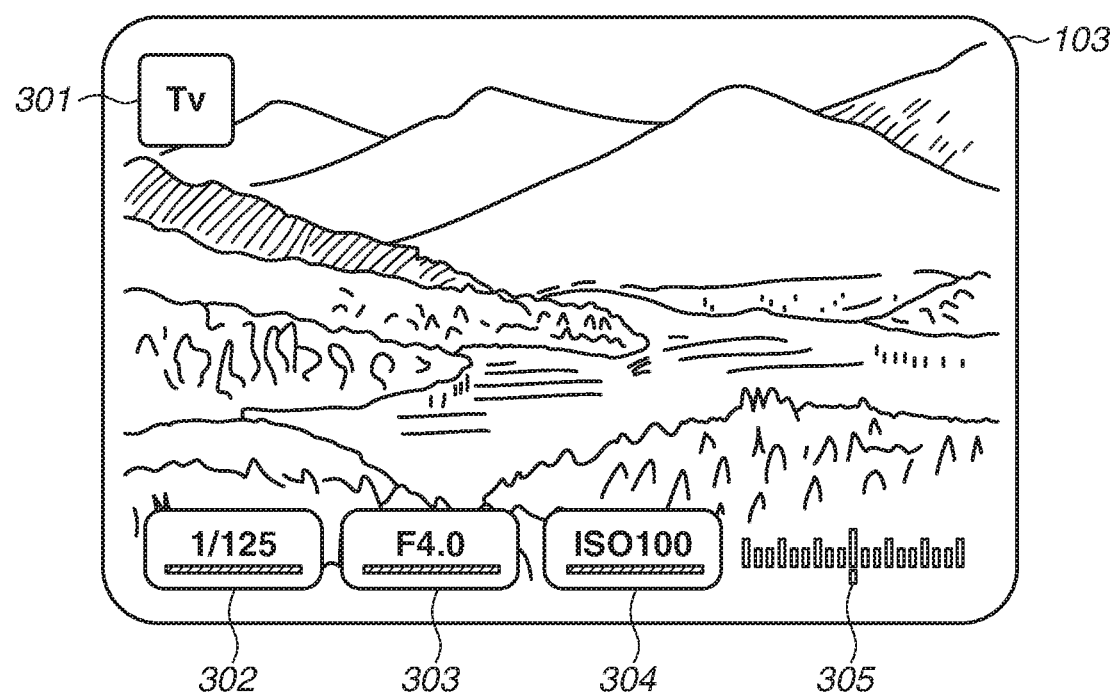
FIG. 3 illustrates display examples of exposure control values according to the first exemplary embodiment of the present invention.

A method for displaying various exposure control values and exposure correction amounts will be described below with reference to FIGS. 3 and 4A to 4C. FIG. 3 illustrates display examples of exposure control values according to the first exemplary embodiment of the present invention. The present exemplary embodiment will be described below centering on a case where a graphical user interface (GUI) including various function icons related to exposure control is displayed in a display screen on the display unit 103.

An image capturing mode display portion 301 displays the image capturing mode selected by the image capturing mode selection unit 109. A shutter speed display portion 302 displays the shutter speed selected by the user or the shutter speed determined by the system control unit 104. An aperture value display portion 303 displays the aperture value selected by the user or the aperture value determined by the system control unit 104. An ISO sensitivity display portion 304 displays the ISO sensitivity selected by the user or the ISO sensitivity determined by the system control unit 104. More specifically, the display unit 103 is capable of displaying setting items for the exposure control values.

An exposure meter display portion 305 visually displays the difference between the exposure control value selected by the user or the current exposure control value and the brightness (luminance value) of the subject. As illustrated in FIG. 3, the center of the exposure meter display portion 305 is the luminance value of the subject as a reference position. The difference from the center position indicates the exposure correction amount. According to the present exemplary embodiment, the exposure correction amount can be set in ±⅓ steps of exposure in the (Additive System of Photographic Exposure) APEX unit. The brightness of the image signal corresponding to the luminance detected by the luminance detection unit 117 can be adjusted by setting an arbitrary exposure correction amount. In a case where at least one exposure control value is automatically set by the image pickup apparatus 100 as automatic values, the exposure correction values are displayed by the exposure meter display portion 305. In a case where all of the exposure control values are fixed values, the differences between the exposure control values and the luminance value are displayed.

FIGS. 4A, 4B, and 4C illustrate methods for displaying the exposure control values according to the first exemplary embodiment of the present invention. FIG. 4A illustrates a case where all of the settable exposure control values are set to fixed values. FIG. 4B illustrates a case where predetermined exposure control values can be automatically set by the system control unit 104. If any exposure control value is not determined by the system control unit 104, "AUTO" is displayed instead of a numerical value. FIG. 4C illustrates a display example when the user is currently changing an exposure control value. A predetermined icon is displayed to the left of the exposure control value currently being changed by the user. FIG. 4C illustrate an example case where the user is currently changing the shutter speed.

As illustrated in FIG. 4B, in the semi-automatic mode according to the present exemplary embodiment, each exposure control value (automatic value) to be automatically set by the system control unit 104 is underlined. In the same semi-automatic mode, on the other hand, when each exposure control value is set to a fixed value, the fixed value is not underlined. More specifically, in the semi-automatic mode, even for the setting item for the same exposure control value, a different function icon is displayed on the display unit 103 depending on whether the exposure control value is set to a fixed value or set to the automatic value.

Table 1 illustrates examples of image capturing modes changeable by the image capturing mode selection unit 109, and examples of exposure control value settings for each of the image capturing modes. As illustrated in Table 1, in the shutter-speed priority mode, the shutter speed can be set to an arbitrary fixed value, and the remaining exposure control values are automatically determined by the system control unit 104 according to the shutter speed setting. As illustrated in Table 1, in the aperture-value priority mode, the aperture value can be set to an arbitrary fixed value, and the remaining exposure control values are automatically determined by the system control unit 104 according to the aperture value setting. In the ISO-sensitivity priority mode, the ISO sensitivity can be set to an arbitrary fixed value, and the remaining exposure control values are automatically determined by the system control unit 104 according to the ISO sensitivity setting. In the manual mode, the shutter speed, aperture value, and ISO sensitivity can be set to arbitrary fixed values. In the full-automatic mode, the system control unit 104 automatically determines the exposure control values including the shutter speed, aperture value, and ISO sensitivity according to the luminance value of the subject. More specifically, in the full-automatic mode, all of the main exposure control values including the shutter speed, aperture value, and ISO sensitivity are automatic values.

In the semi-automatic mode, the user can select, without changing the image capturing mode, whether the exposure control values are to be set to arbitrary fixed values or automatically set by the system control unit 104 in response to a user operation. More specifically, in the semi-automatic mode, the exposure control values can be set by the same method (setting conditions) as the method in the above-described various image capturing modes (shutter-speed priority mode, aperture-value priority mode, ISO-sensitivity priority mode, manual mode, and full-automatic mode). This completes the description of the basic configuration of the image pickup apparatus 100.

(Program Diagram Setting Method)

A method for setting the exposure control values in the semi-automatic mode will be described in detail below with reference to FIGS. 5 to 8 and Table 2. According to the present exemplary embodiment, exposure control is performed based on program diagrams as exposure conditions with which combinations of predetermined exposure control values are predetermined according to the luminance value of the subject in accordance with a predetermined rule. Program diagrams prestored in the memory 106 differ according to the image capturing mode and exposure condition changes, and are changed by the system control unit 104 in accordance with the change of the image capturing mode by the user.

FIGS. 5A to 5D illustrate examples of program diagrams related to exposure control settable by the image pickup apparatus 100 according to the first exemplary embodiment of the present invention. FIG. 5A illustrates program diagrams when the user sets a certain shutter speed in the shutter-speed priority mode. FIG. 5B illustrates program diagrams when the user sets a certain aperture value in the aperture-value priority mode. FIG. 5C illustrates program diagrams when the user sets a certain ISO sensitivity in the ISO-sensitivity priority mode. For the program diagrams in each of the above-described priority modes, other exposure control values are set centering on an exposure control value set to a fixed value by the user. FIG. 5D illustrates program diagrams used when the system control unit 104 automatically determines the exposure control values in the full-automatic mode. Referring to the program diagrams illustrated in FIGS. 5A to 5D, the horizontal axis denotes the luminance value. The more rightward position on the horizontal axis denotes the higher luminance value. Referring to the program diagrams illustrated in FIGS. 5A to 5D, the vertical axis denotes the magnitude of each exposure control value. The more upward position on the vertical axis denotes the higher shutter speed, the larger aperture value (closing side), and the higher ISO sensitivity (high sensitivity side).

In the image pickup apparatus 100 according to the present exemplary embodiment, after the user sets the semi-automatic mode, the exposure control values (or AUTO) automatically set by the system control unit 104 are set first. Program diagrams to be used in this case are the same as the above-described program diagrams for the full-automatic mode. Then, when the user changes an arbitrary exposure control value to a fixed value through a manual operation, the system control unit 104 automatically sets other exposure control values based on the exposure control value set to a fixed value. For example, when the user sets only the shutter speed to an arbitrary fixed value, other exposure control values are set by using the same program diagrams as the program diagrams for the shutter-speed priority mode. When the user sets all of the exposure control values to fixed values in the semi-automatic mode, the user sets the exposure control values to arbitrary values without using the program diagrams as in the manual mode. More specifically, in the semi-automatic mode according to the present exemplary embodiment, when the user sets the same setting conditions as those for another image capturing mode, the system control unit 104 uses the same program diagrams as those of the image capturing mode having the same setting conditions.

Figure 6:
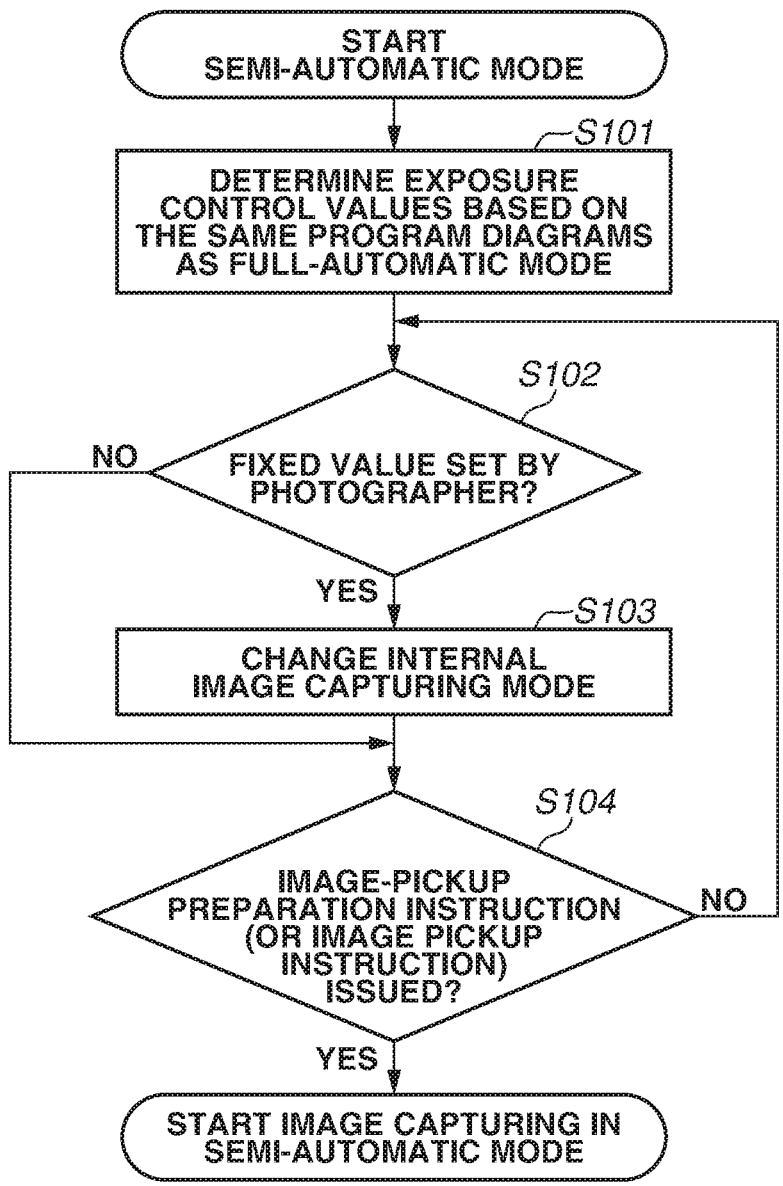
FIG. 6 is a flowchart illustrating program diagram transition processing in a semi-automatic mode according to the first exemplary embodiment of the present invention.

Processing for determining the exposure control values in the semi-automatic mode will be described below with reference to FIG. 6. FIG. 6 is a flowchart illustrating program diagram transition processing in the semi-automatic mode according to the first exemplary embodiment of the present invention. Referring to FIG. 6, when the image capturing mode is set to the semi-automatic mode, then in step S101, the system control unit 104 determines the exposure control values by using the same program diagrams as those used in the full-automatic mode.

In step S102, the system control unit 104 determines whether any exposure control value is changed to a fixed value by the user. More specifically, in step 102, the system control unit 104 determines whether the user sets an arbitrary exposure control value to a fixed value other than the automatic value from a state where the exposure control values are automatically set, as in the full-automatic mode.

In step S103, the system control unit 104 changes the internal image capturing mode based on the user-set fixed value. The processing in step S103 depends on the exposure control value set to a fixed value by the user. According to the present exemplary embodiment, in a case where all of the exposure control values settable by the image pickup apparatus 100 are set to fixed values, the system control unit 104 sets the internal image capturing mode (not notified to the user) to the same conditions as those in the manual mode while maintaining the semi-automatic mode. According to the present exemplary embodiment, in a case where any one exposure control value is automatically settable, the system control unit 104 sets the corresponding program diagrams based on the exposure control value set to a fixed value.

Table 2 illustrates the internal image capturing modes and the exposure control value settings. In the processing in step S103, the system control unit 104 determines the internal image capturing mode based on the table data illustrated in Table 2.

As illustrated in Table 2, according to the present exemplary embodiment, when two exposure control values are set to fixed values, the system control unit 104 sets the internal image capturing mode (in other words, corresponding program diagrams) based on the exposure control value to be more preferentially set. For example, when both the shutter speed and the ISO sensitivity are set to fixed values, the system control unit 104 sets the internal image capturing mode to the shutter-speed priority mode.

This is because, when changing the same amount of exposure, the image signal change due to the shutter speed change is relatively larger than the image signal change due to the ISO sensitivity change. The relation between the aperture value and the ISO sensitivity is similar to the relation between the shutter speed and the ISO sensitivity. The amount of image signal change refers to the change of an effect applied to the image when the image signal-based image is viewed by the user. More specifically, in the semi-automatic mode according to the present exemplary embodiment, when two different exposure control values are set to fixed values, the internal image capturing mode which gives priority to the exposure control value having a larger change in the effect on the image signal is set.

In the present exemplary embodiment, when two different exposure control values are set to fixed values, the internal image capturing mode is set based on the exposure control value to be given priority. However, the present invention is not limited thereto. For example, the present exemplary embodiment may be configured to use program diagrams in which, when the shutter speed and the ISO sensitivity are set to fixed values, the shutter speed and the ISO sensitivity values are fixed and only the aperture value changes according to the luminance value change. In this case, there is no image capturing mode using program diagrams providing the same image capturing conditions as those in the semi-automatic mode as an image capturing mode actually settable by the image pickup apparatus 100, but these program diagrams can be held as program diagrams for the semi-automatic mode. While the data amount increases by holding a new program diagram, since program diagrams are usable in common with the same internal image capturing modes as those for another image capturing mode, the data amount can be relatively reduced in comparison with a case where program diagrams are held for each image capturing condition for the semi-automatic mode.

Returning to FIG. 6, in step S104, the system control unit 104 determines whether an image-pickup preparation instruction or an image pickup instruction has been issued by the user. When an image-pickup preparation instruction or an image pickup instruction has been issued by the user (YES in step S104), the system control unit 104 ends the processing according to the flowchart illustrated in FIG. 6. Then, the system control unit 104 proceeds to the processing for capturing an image of the subject. On the other hand, when neither an image-pickup preparation instruction nor an image pickup instruction is issued by the user (NO in step S104), the processing returns to step S102.

Referring now to FIG. 7, program diagram transitions in the semi-automatic mode will now be described centering on a case where, in the semi-automatic mode, the internal image capturing mode is changed from the full-automatic mode to the shutter-speed priority mode. This operation corresponds to the processing in step S103 performed in a case where the system control unit 104 determines that an exposure control value is changed to a fixed value by the user (YES in step S102). FIG. 7 illustrates examples of program diagram transitions in the semi-automatic mode according to the first exemplary embodiment. According to the display screens illustrated in FIG. 7, the semi-automatic mode is referred to as an Fv mode.

As illustrated in FIG. 7, in the semi-automatic mode, the user changes the automatically set shutter speed ($1/125$ seconds) to a fixed value ($1/160$ seconds), and the internal image capturing mode changes from the full-automatic mode to the shutter-speed priority mode. In this case, the shutter speed display portion 302 changes from the display indicating that the shutter speed is automatically set (underlined) to the display indicating that the shutter speed is set to a fixed value (not underlined). On the other hand, the image capturing mode display portion 301 does not change the display related to the actual image capturing mode ("Fv" remains unchanged) regardless of the internal image capturing mode change. More specifically, when the image pickup apparatus 100 according to the present exemplary embodiment is set to the semi-automatic mode, the user can freely change the desired exposure control values without changing the actual image capturing mode, achieving image capturing condition changes substantially equivalent to the image capturing mode change.

The user can freely set the exposure control values in the semi-automatic mode through simple user operations, by using not only operation members for mechanically inputting the operation amount through manual operation of a user but also the GUI display on the display unit 103.

The internal image capturing mode change in the semi-automatic mode substantially coincides with the actual image capturing mode change using the image capturing mode selection unit 109. More specifically, for image capturing conditions identical to those for another image capturing mode among the image capturing conditions implementable in the semi-automatic mode, the image capturing conditions of the image capturing mode may be used. For example, for image capturing conditions identical to those for another image capturing mode among the image capturing conditions implementable in the semi-automatic mode, program diagrams common to these modes are used.

In the image pickup apparatus 100 according to the present exemplary embodiment employing the above-described configuration, no large differences arise between the actual image capturing mode change and the image capturing condition change in the semi-automatic mode. Accordingly, the image pickup apparatus 100 can provide the user with image capturing modes in which the exposure control values can be changed through simple operations without giving the sense of discomfort to the user due to differences between the image capturing modes. In the image pickup apparatus 100 according to the present exemplary embodiment, the image capturing conditions in the internal image capturing mode in the semi-automatic mode and the image capturing mode actually selectable by the user can be made substantially the same. As a result, it is possible to restrict the data amount to be held by the image pickup apparatus 100 as data related to the image capturing conditions for the semi-automatic mode and reduce the development cost.

(Auto Bracketing)

A case where exposure auto bracketing (hereinafter simply referred to as auto bracketing) for capturing an image of the subject with a plurality of different exposures in the above-described semi-automatic mode will be described. The image pickup apparatus 100 according to the present exemplary embodiment is provided with an auto bracketing function of performing image pickup a plurality of times while changing predetermined exposure control values as user-settable items. The auto bracketing function can be independently set, unlike the above-described image capturing mode, and therefore can be set in each image capturing mode.

When executing the auto bracketing function, the target exposure control value to be changed in auto bracketing differs according to the image capturing mode. Table 3 illustrates the image capturing modes and examples of change priorities of the exposure control values at the time of auto bracketing. As illustrated in Table 3, in the shutter-speed priority mode, for example, the system control unit 104 preferentially changes the ISO sensitivity at the time of auto bracketing. If the ISO sensitivity cannot be changed (for example, if the ISO sensitivity reaches a limit value setting), the system control unit 104 changes the aperture value.

FIG. 8 illustrates examples of exposure control value changes at the time of auto bracketing in the shutter-speed priority mode according to the first exemplary embodiment of the present invention. As illustrated in FIG. 8, in the first image pickup (reference exposure) at the time of auto bracketing in the shutter-speed priority mode, the image pickup apparatus 100 performs image pickup based on the user-set fixed value of the shutter speed and the aperture value and the ISO sensitivity automatically set by the system control unit 104. In the second image pickup (more overexposure than the reference exposure), the image pickup apparatus 100 performs image pickup based on the ISO sensitivity automatically changed by the system control unit 104 from the state of the first image pickup. In the third image pickup (more underexposure than the reference exposure), the image pickup apparatus 100 performs image pickup based on the aperture value automatically changed by the system control unit 104 from the state of the first image pickup. In auto bracketing in the shutter-speed priority mode, the system control unit 104 preferentially changes the ISO sensitivity as a change target exposure control value. If the ISO sensitivity with the reference exposure has reached a settable limit value (upper or lower limit), the system control unit 104 changes the aperture value instead of the ISO sensitivity.

In the semi-automatic mode, the exposure control value to be changed at the time of auto bracketing differs for each internal image capturing mode. For example, in the semi-automatic mode, if the internal image capturing mode is the shutter-speed priority mode, the system control unit 104 preferentially changes the ISO sensitivity. When the internal image capturing mode is changed to the ISO-sensitivity priority mode in this state, the system control unit 104 preferentially changes the shutter speed before performing auto bracketing. More specifically, in the semi-automatic mode, the system control unit 104 sets the exposure control value to be changed at the time of auto bracketing according to the actual image capturing mode providing the same image capturing conditions as the set internal image capturing mode. In other words, in the semi-automatic mode, the exposure control value to be preferentially changed at the time of auto bracketing changes according to the exposure control value set to a fixed value by the user.

Figure 9:
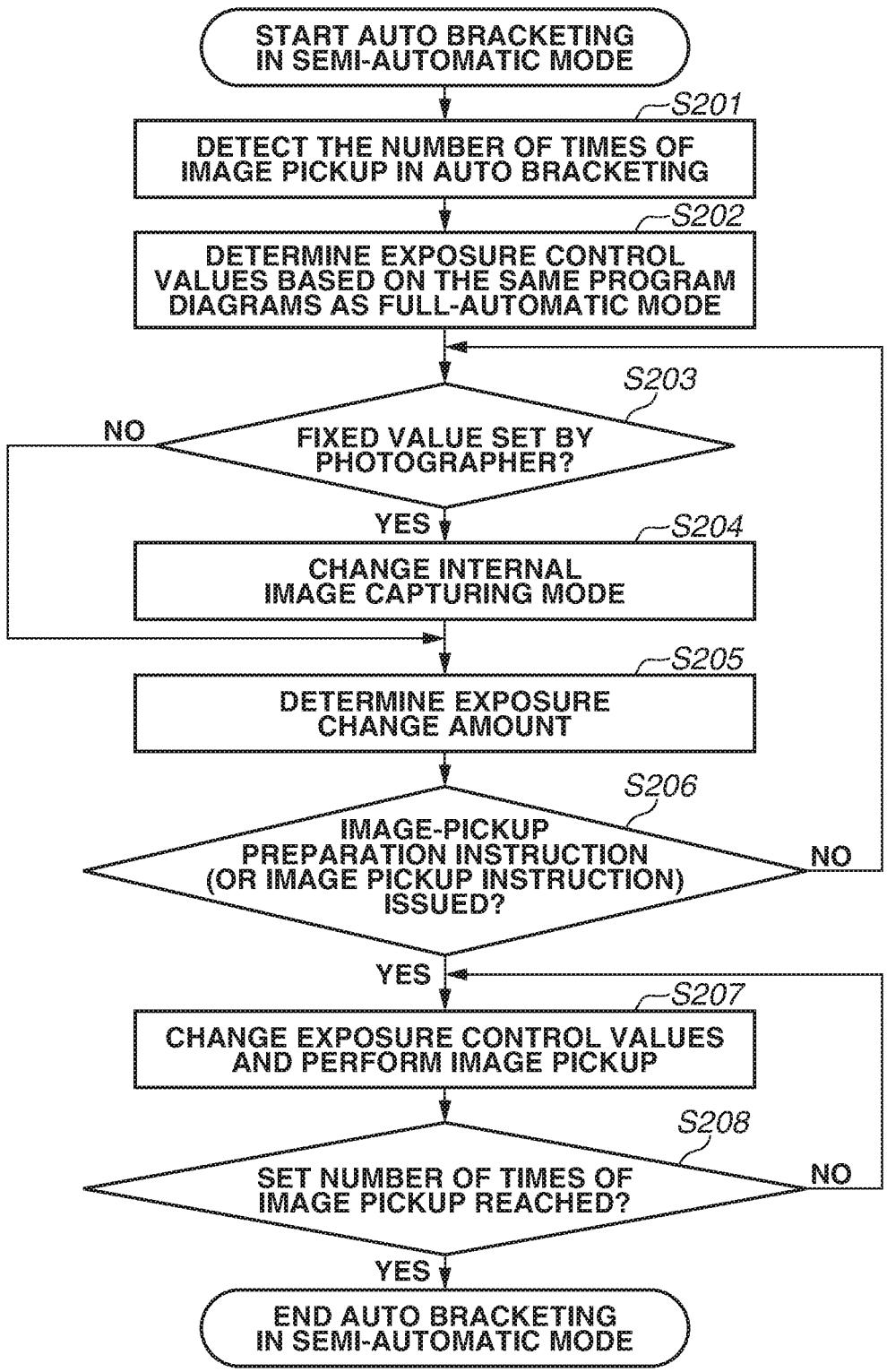
FIG. 9 is a flowchart illustrating auto bracketing processing in the semi-automatic mode according to the first exemplary embodiment of the present invention.

FIG. 9 is a flowchart illustrating auto bracketing processing in the semi-automatic mode according to the first exemplary embodiment of the present invention. In step S201, the system control unit 104 detects the number of times of image pickup in auto bracketing set by the user. For the number of times of image pickup in auto bracketing, the user may preset an arbitrary number, for example, through a menu displayed, or select a predetermined number on the image pickup apparatus 100. For the number of times of image pickup in auto bracketing, the system control unit 104 may automatically calculate the number based on the subject state and captured scene.

Processing in subsequent steps S202 to S204 is similar to the processing in steps S101 to S103 illustrated to FIG. 6, respectively, and thus redundant descriptions thereof will be omitted. In step S205, the system control unit 104 determines the exposure change amount according to the number of times of image pickup detected in step S201. For example, if image pickup is performed three times in auto bracketing, the exposure step of each image pickup uses two steps of exposure (assuming that 1 Ev in APEX unit is one step of exposure). If image pickup is performed five times, the exposure step of each image pickup uses one step of exposure. Processing in step S206 is similar to the processing in step S104 illustrated to FIG. 6, and thus a redundant description thereof will be omitted.

In step S207, the system control unit 104 changes the exposure control values according to the exposure change amount determined in step S205 and performs image pickup once in auto bracketing. As described above, the exposure control value to be changed is determined with reference to the information such as table data illustrated in Table 3 based on the current image capturing conditions (internal image capturing mode) in the semi-automatic mode.

In step S208, the system control unit 104 determines whether the number of times of image pickup up to the image pickup corresponding to the processing in step S207 has reached the previously detected number of times of image pickup in auto bracketing. The number of times of image pickup in auto bracketing is counted by the system control unit 104, and the result of counting is stored in the primary recording area of the memory 106. In the processing in step S201, the system control unit 104 resets the count of the number of times of image pickup in auto bracketing and increments the count by one upon completion of the processing in step S207.

If the system control unit 104 determines that the number of times of image pickup has not reached the number of times of image pickup in auto bracketing (NO in step S208), the processing returns to in step S207 to repeat image pickup. If the system control unit 104 determines that the number of times of image pickup has reached the number of times of image pickup in auto bracketing (YES in step S208), the system control unit 104 ends the auto bracketing processing.

As described above, in the image pickup apparatus 100 according to the present exemplary embodiment, the exposure control value to be preferentially changed at the time of exposure auto bracketing in the semi-automatic mode is determined according to the internal image capturing mode in the semi-automatic mode. This configuration of the image pickup apparatus 100 according to the present exemplary embodiment enables the exposure control value to be preferentially changed to be matched between the internal image capturing mode in the semi-automatic mode and the actual image capturing mode.

In the image pickup apparatus 100 according to the present exemplary embodiment, the exposure control value to be preferentially changed at the time of auto bracketing differs according to whether the user has set an arbitrary exposure control value as a fixed value in the semi-automatic mode. In this case, the user is enabled not only to freely set a fixed exposure control value without changing the image capturing mode but also to perform auto bracketing in which an exposure control value according to the user's intention is set to a fixed value and other exposure control values are preferentially changed. Accordingly, the image pickup apparatus 100 according to the present exemplary embodiment enables the user to perform exposure auto bracketing according to the user's intention without performing complicated operations.

(High-Dynamic-Range Image Capturing)

A case where, in order to acquire an image with an extended dynamic range in the above-described semi-automatic mode, the image pickup apparatus 100 performs high-dynamic-range image capturing (hereinafter referred to as HDR image capturing) for acquiring a plurality of images having different brightness for combining will be described. The image pickup apparatus 100 according to the present exemplary embodiment is provided with a high dynamic range (HDR) image capturing function of performing image pickup a plurality of times with different exposures for obtaining images to be combined by changing predetermined exposure control values as user-settable items. The HDR image capturing function can be independently set, unlike the above-described image capturing mode, and therefore can be set in each image capturing mode.

When executing the HDR image capturing function, the difference in brightness between images subjected to combination are set by differentiating the exposure when capturing images of the subject to acquire images used for compositions. The exposure control value to be changed in each image pickup in HDR image capturing differs according to the image capturing mode. Table 4 illustrates the image capturing modes and examples of change priorities of the exposure control values at the time of HDR image capturing. As illustrated in Table 4, in the shutter-speed priority mode, for example, the system control unit 104 preferentially changes only the ISO sensitivity at the time of HDR image capturing. In the aperture-value priority mode, the system control unit 104 sets an exposure difference in each image pickup by preferentially changing the ISO sensitivity at the time of HDR image capturing, and, if the ISO sensitivity has reached a settable limit value, by changing the shutter speed.

FIG. 10 illustrates examples of exposure control value changes at the time of HDR image capturing in the shutter-speed priority mode according to the first exemplary embodiment of the present invention. As illustrated in FIG. 10, in the first image pickup at the time of HDR image capturing in the shutter-speed priority mode (reference exposure), the image pickup apparatus 100 performs image pickup based on the user-set fixed value of the shutter speed and the aperture value and the ISO sensitivity automatically set by the system control unit 104. In the second image pickup (more overexposure than the reference exposure) and the third image pickup (more underexposure than the reference exposure), the image pickup apparatus 100 performs image pickup based on the ISO sensitivity automatically changed by the system control unit 104 from the state of the first image pickup.

In the semi-automatic mode, the exposure control value to be changed at the time of HDR image capturing differs according to the internal image capturing mode. For example, if the internal image capturing mode is the shutter-speed priority mode in the semi-automatic mode, the system control unit 104 preferentially changes the ISO sensitivity. When the internal image capturing mode is changed from this state to the ISO-sensitivity priority mode, the system control unit 104 preferentially changes the shutter speed before performing HDR image capturing. More specifically, in the semi-automatic mode, the exposure control value to be changed at the time of HDR image capturing is set according to the actual image capturing mode providing the same image capturing conditions as the set internal image capturing mode. In other words, in the semi-automatic mode, the exposure control value to be preferentially changed at the time of HDR image capturing changes according to the exposure control value set to a fixed value by the user.

This configuration is substantially the same as the above-described configuration of auto bracketing and is characterized in that, in HDR image capturing, images subjected to combination acquired in each image pickup are combined to obtain one image with an extended brightness dynamic range. The image combination may be performed inside the image pickup apparatus 100 or performed outside the image pickup apparatus 100. More specifically, the image pickup apparatus 100 may be configured only to acquire images to be subjected to combination through HDR image capturing.

Figure 11:
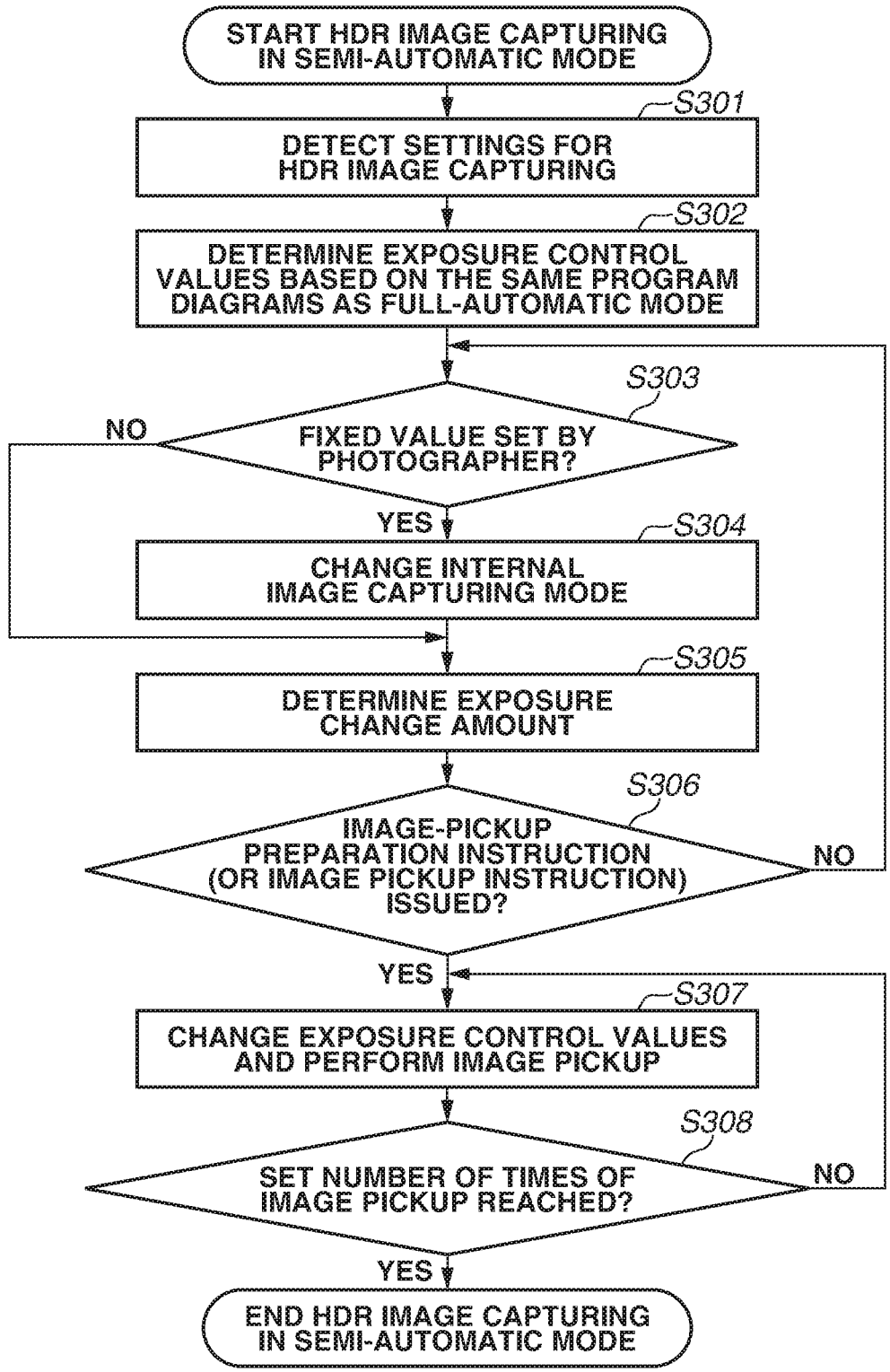
FIG. 11 is a flowchart illustrating HDR image capturing processing in the semi-automatic mode according to the first exemplary embodiment of the present invention.

FIG. 11 is a flowchart illustrating HDR image capturing processing in the semi-automatic mode according to the first exemplary embodiment of the present invention. In step S301, the system control unit 104 detects various user-set settings related to HDR image capturing. Examples of various settings related to HDR image capturing include the number of times of image pickup (number of acquired images subjected to combination) and exposure step for each image in HDR image capturing.

For example, the number of times of image pickup and the exposure step in HDR image capturing may be preset to arbitrary values by the user through a menu displayed on the image pickup apparatus 100. Alternatively, the number of times of image pickup and the exposure step predetermined by the image pickup apparatus 100 may be used. The system control unit 104 may automatically calculate the number of times of image pickup and the exposure step based on the luminance value of the subject.

According to the present exemplary embodiment, images to be used to generate one HDR image include three different images: a proper exposure image, an overexposure image, and an underexposure image. Performing image pickup three times is set as the reference for image pickup in a series of HDR image capturing. The exposure step needs to provide a desired dynamic range of one image after combination (HDR image).

Processing in subsequent steps S302 to S304 is similar to the processing in steps S101 to S103 illustrated to FIG. 6, respectively, and thus redundant descriptions thereof will be omitted. In step S305, the system control unit 104 determines the exposure change amount according to the number of times of image pickup and the exposure step detected in step S301. Since processing in step S306 is similar to the processing in step S104 illustrated to FIG. 6, and thus a redundant description thereof will be omitted.

In step S307, the system control unit 104 changes the exposure control value according to the exposure change amount determined in step S305 and then performs image pickup once in HDR image capturing. As described above, the exposure control value to be changed is determined with reference to the information such as table data illustrated in Table 4 according to the current image capturing conditions (internal image capturing mode) in the semi-automatic mode. Processing in subsequent step S308 is substantially similar to the processing in step S208 illustrated to FIG. 9, and thus a redundant description thereof will be omitted.

In HDR image capturing, unlike the above-described auto bracketing, the system control unit 104 does not change the aperture value in order to set the exposure step in any image capturing mode and in the internal image capturing mode. For example, in a case where HDR image capturing is performed with the changed aperture value, the depth of field also differs according to the difference in the aperture value. Accordingly, combining a plurality of images obtained with the differentiated aperture value may possibly degrade the quality of the HDR image after combination. Therefore, at the time of HDR image capturing according to the present exemplary embodiment, to prevent the degradation of the HDR image quality, the system control unit 104 sets the exposure step by preferentially changing the exposure control values other than the aperture value in any image capturing mode. HDR image capturing may be performed with the differentiated aperture value, for example, when another exposure control value has reached a settable limit value.

As described above, in the image pickup apparatus 100 according to the present exemplary embodiment, the exposure control value to be preferentially changed at the time of HDR image capturing in the semi-automatic mode is determined according to the internal image capturing mode in the semi-automatic mode. This configuration of the image pickup apparatus 100 according to the present exemplary embodiment enables the exposure control value to be preferentially changed to be matched between the internal image capturing mode in the semi-automatic mode and the actual image capturing mode. Therefore, the image pickup apparatus 100 according to the present exemplary embodiment enables preventing the acquisition of HDR images (or images subjected to combination) with different brightness in another image capturing mode and in the semi-automatic mode providing the same image capturing conditions as the image capturing mode.

In the image pickup apparatus 100 according to the present exemplary embodiment, the exposure control value to be preferentially changed at the time of HDR image capturing differs according to whether the user has set an arbitrary exposure control value as a fixed value in the semi-automatic mode. In this case, the user is enabled not only to freely set a fixed exposure control value without changing the image capturing mode but also to perform HDR image capturing in which an exposure control value according to the user's intention is set to a fixed value and other exposure control values are preferentially changed. Therefore, the image pickup apparatus 100 according to the present exemplary embodiment enables the user to perform HDR image capturing according to the user's intention without performing complicated operations.

(Light-Emission Image Capturing)

To determine the brightness of an image, it is necessary to take into consideration the above-described exposure control values but also the lighting of the subject by the built-in stroboscope 119 and the external stroboscope as light emission apparatuses. Generally, light emission modes allowed to be set for these light emission apparatuses include an automatic light emission mode in which light-emission/non-light-emission is automatically determined by the apparatus, and a forced light-emission/non-light-emission mode in which light-emission/non-light-emission is forcibly determined, respectively, in response to an input of a user operation. These light emission modes can be set also in the image pickup apparatus 100 according to the present exemplary embodiment and can be set independently of the above-described image capturing mode.

As a technique for light-emission image capturing using a light emission apparatus, a known image capturing technique (slow synchronous image capturing) sets a longer exposure time of the image sensor than the exposure time at the time of normal light-emission image capturing. Performing slow synchronous image capturing in this way enables preventing a state where only subjects close to the light emission apparatus are brightly illuminated and background portions not illuminated by light are subjected to underexposure. The image pickup apparatus 100 according to the present exemplary embodiment enables the user to set the slow synchronous image capturing function through a menu screen related to the light emission apparatus in the automatic and the forced light emission modes from among the above-described light emission modes.

Table 5 illustrates the image capturing modes and functions at the time of light-emission image capturing. In the automatic light emission mode from among light emission modes, the system control unit 104 (or a stroboscope control unit (not illustrated) included in the external stroboscope) controls light-emission or non-light-emission according to the brightness of the subject under the light control in consideration of the exposure control values according to the luminance value of the subject. More specifically, the light emission of the built-in stroboscope 119 and the external stroboscope needs to be determined in consideration of the relation with the exposure control values. As illustrated in Table 5, according to the present exemplary embodiment, the automatic light emission mode can be set in the full-automatic mode in which the exposure control values are automatically set by the image pickup apparatus 100.

The automatic light emission mode can be set also in the aperture-value priority mode in addition to the full-automatic mode. In view of the synchronization between the light emission of the built-in stroboscope 119 and the external stroboscope and the shutter speed, the shortest time of the shutter speed settable at the time of light-emission image capturing is longer than the shortest time of the shutter speed settable at the time of non-light-emission image capturing (limited to the low speed side). As a result, in the shutter-speed priority mode or the manual mode, if the user-set fixed value of the shutter speed is faster than the shortest time enabling light-emission image capturing, the brightness of an image obtained by light-emission image capturing may become unnatural. Therefore, in image capturing modes in which the shutter speed needs to be limited in some image capturing conditions, the automatic light emission mode may not be settable. In other image capturing modes (full-automatic mode and aperture-value priority mode), the automatic light emission mode may be settable.

The shutter speed needs to be set in consideration of the synchronization with the light emission by the light emission apparatus. Therefore, in the image pickup apparatus 100 according to the present exemplary embodiment, as illustrated in Table 5, the slow synchronous image capturing function is not settable in the shutter-speed priority mode and the manual mode in which the fixed shutter speed can be set. According to the present exemplary embodiment, the shortest time of the shutter speed enabling light-emission image capturing is 1/200 seconds, and the reference shutter speed at the time of light-emission image capturing is 1/60 seconds.

In the semi-automatic mode, as described above, the exposure control values can be freely set to provide the same image capturing conditions as those for another image capturing mode. In this case, in the semi-automatic mode, the same image capturing conditions as the image capturing mode (for example, full-automatic mode) in which the automatic light emission mode and the slow synchronous image capturing function are settable, and an image capturing mode (for example, shutter-speed priority mode) in which the automatic light emission mode and the slow synchronous image capturing function are not settable can be set in one image capturing mode.

However, in one image capturing mode, if various light-emission image capturing conditions change according to the exposure control values manually set by the user, the user may possibly be confused. For example, in the semi-automatic mode, in a case where the internal image capturing mode is the full-automatic mode and the user sets the automatic light emission mode, the user may possibly get confused if the automatic light emission mode is canceled as the result of the user setting the shutter speed to a fixed value. Further, in a case where the user sets the slow synchronous image capturing function in the semi-automatic mode, the user may possibly get confused if the slow synchronous image capturing is disabled as a result of the user setting an arbitrary exposure control value to a fixed value.

As illustrated in Table 5, in the image pickup apparatus 100 according to the present exemplary embodiment, the automatic light emission mode and the slow synchronous image capturing function are not settable in the semi-automatic mode. In other words, the image pickup apparatus 100 according to the present exemplary embodiment is configured to control the function limitation on the light emission apparatus according to the image capturing mode regardless of the automatic setting and the fixed value settings for the exposure control values. More specifically, according to the present exemplary embodiment, the system control unit 104 controls whether to set the automatic light emission mode and the slow synchronous image capturing function according to the image capturing mode set in the image pickup apparatus 100. This configuration of the image pickup apparatus 100 according to the present exemplary embodiment enables preventing changes in various settings of the light emission apparatus according to the exposure control value settings in the semi-automatic mode, thus preventing the user from feeling strangeness.

(Safety Shift Function for Proper Exposure)

Conventionally, a function of automatically changing fixed values (hereinafter referred to as a safety shift function) is known. In this function, the image pickup apparatus automatically changes the user-set fixed values if the user-set fixed exposure control values do not provide the proper exposure corresponding to the luminance value of the subject.

As described above, the semi-automatic mode is an image capturing mode in which the user can change exposure control values to arbitrary fixed values from a state where the image pickup apparatus 100 can automatically set the exposure control values, without changing the image capturing mode. The image pickup apparatus 100 prestores information about a reference for determining the proper exposure according to the luminance value of the subject. For example, in the full-automatic mode, the image pickup apparatus 100 adjusts various types of exposure control values so as to provide the proper exposure based on the luminance value of the subject. In the semi-automatic mode, however, if the user-set fixed values do not provide the proper exposure, each exposure control value may change due to the exposure control values being changed by the above-described safety shift function. In this case, the user feels strangeness.

Figure 12:
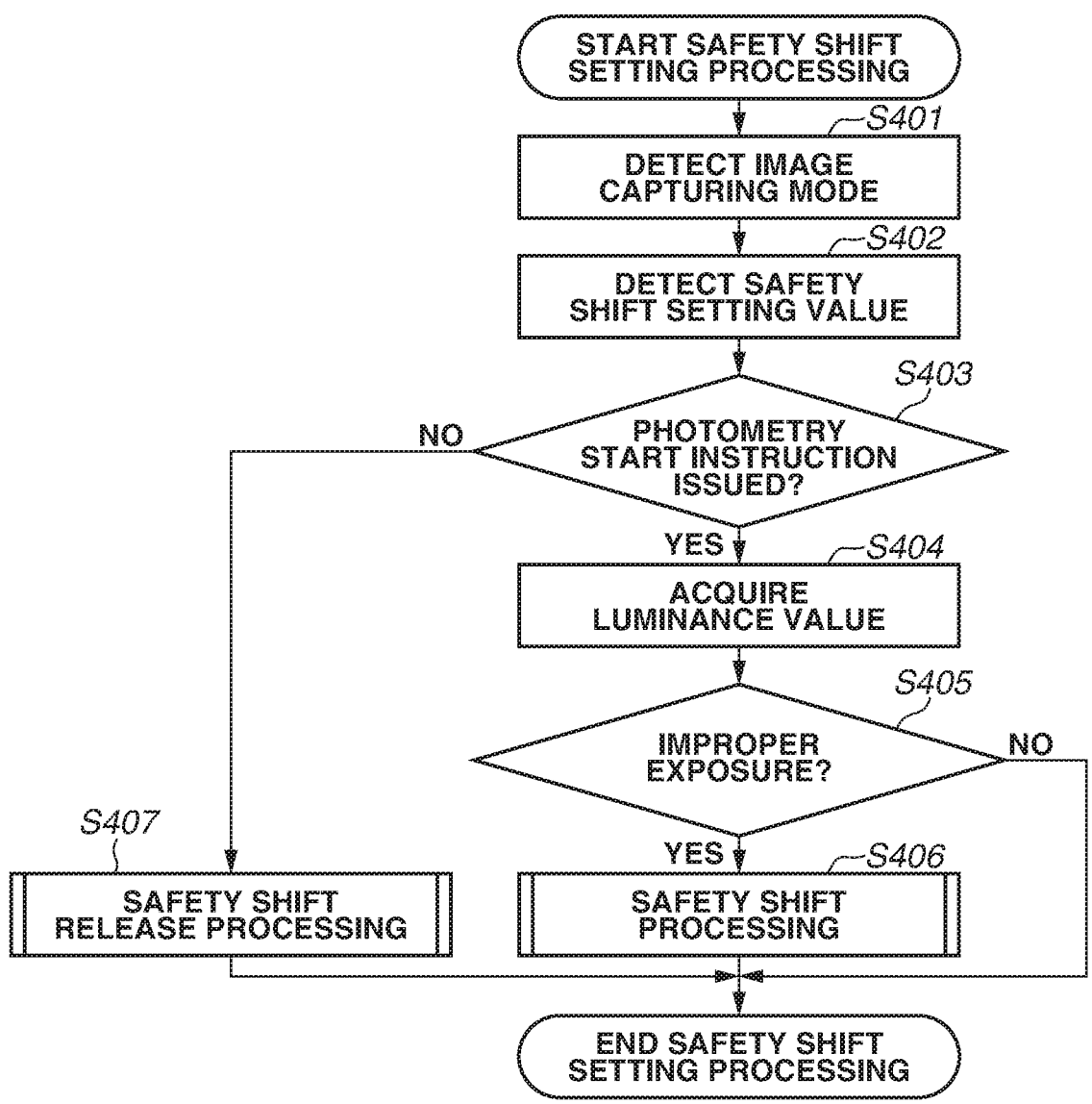
FIG. 12 is a flowchart illustrating safety shift setting processing according to the first exemplary embodiment of the present invention.

For this reason, the image pickup apparatus 100 according to the present exemplary embodiment is configured not to enable the safety shift function in the semi-automatic mode. The safety shift function will be described in detail below with reference to FIGS. 12 to 14. FIG. 12 is a flowchart illustrating safety shift setting processing according to the first exemplary embodiment of the present invention. When power of the image pickup apparatus 100 is turned ON, then in step S401, the system control unit 104 detects the currently set image capturing mode (actual image capturing mode). Information about the currently set image capturing mode is stored in the recording unit 115 or in the storage area of the memory 106 and is updated each time the image capturing mode is set.

In step S402, the system control unit 104 acquires safety shift setting values from the recording unit 115. The safety shift setting values include information about the safety shift mode. The image pickup apparatus 100 according to the present exemplary embodiment is provided with a Tv/Av safety shift mode in which the proper exposure is set by changing the shutter speed or the aperture value, and an ISO safety shift mode in which the proper exposure is set by changing the ISO sensitivity. The image pickup apparatus 100 according to the present exemplary embodiment is also provided with a safety shift OFF mode in which the safety shift function is not executed.

In step S403, the system control unit 104 determines whether an instruction for starting photometry on the subject has been issued. According to the present exemplary embodiment, to start photometry on the subject in response to an image-pickup preparation instruction, the system control unit 104 determines, in step S403, whether the image-pickup preparation instruction according to an operation on the image pickup instruction unit 110 has been issued. If the instruction for starting photometry has been issued (YES in step S403), the processing proceeds to step S404. In step S404, the system control unit 104 acquires the luminance value of the subject based on the above-described method. If the instruction for starting photometry has not been issued (NO in step S403), the processing proceeds to step 407. In step S407, the system control unit 104 performs safety shift release processing to be described below.

In step S405, the system control unit 104 performs exposure control based on the luminance value acquired in step S404 according to the current image capturing mode and determines whether the exposure control values after the exposure control provide the proper exposure. If the system control unit 104 determines that an improper exposure results (YES in step S405), the processing proceeds to step S406. In step S406, the system control unit 104 performs safety shift processing to be described below. If the system control unit 104 determines that the proper exposure results (NO in step S405), the system control unit 104 ends the safety shift setting processing.

Figure 13:
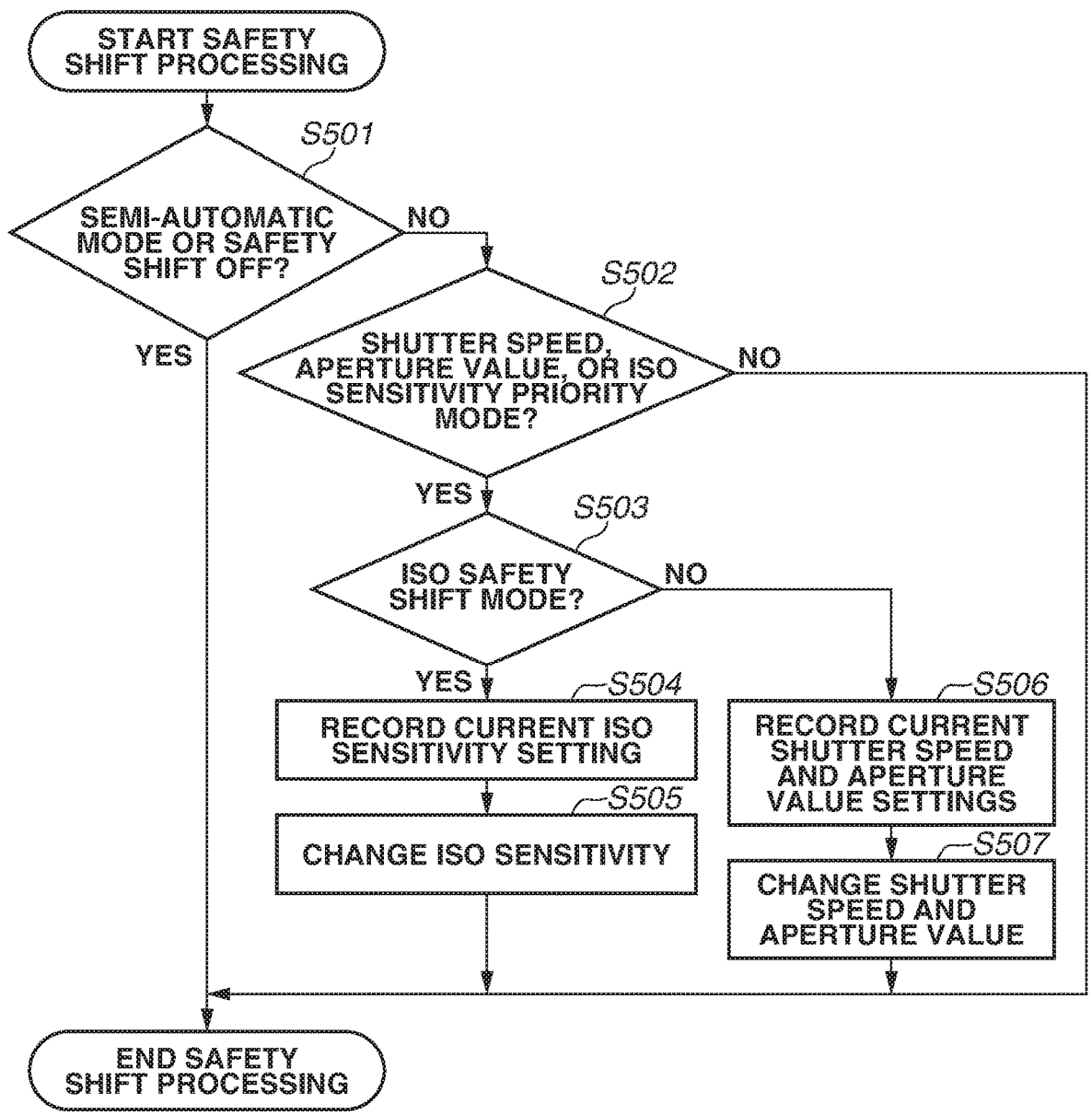
FIG. 13 is a flowchart illustrating safety shift processing according to the first exemplary embodiment of the present invention.

The safety shift processing performed by the image pickup apparatus 100 according to the present exemplary embodiment will be described below with reference to FIG. 13. FIG. 13 is a flowchart illustrating the safety shift processing according to the first exemplary embodiment of the present invention. When the system control unit 104 proceeds to the safety shift processing in step S406, then in step S501, the system control unit 104 will determine whether the image capturing mode detected in the processing in step S401 is the semi-automatic mode. The system control unit 104 also determines whether the safety shift OFF mode is set based on the safety shift setting value detected in the processing in step S402. If the image capturing mode is the semi-automatic mode or if the safety shift OFF mode is set (YES in step S501), the system control unit 104 ends the safety shift processing. More specifically, in a case where the image capturing mode is the semi-automatic mode or where the safety shift function is set not to be executed in the image pickup apparatus 100, the system control unit 104 does not execute the safety shift function.

In step S502, the system control unit 104 determines whether the image capturing mode detected in the processing in step S401 is any one of the shutter-speed priority mode, the aperture-value priority mode, and the ISO-sensitivity priority mode. If the system control unit 104 determines that the image capturing mode is none of the above-described image capturing modes (NO in step S502), the system control unit 104 ends the safety shift processing.

In other words, when the image capturing mode is the full-automatic or the manual mode, the system control unit 104 does not execute the safety shift function. In the manual mode, if the safety shift function is executed, the function may change the user-set fixed values, possibly making the user feel strangeness. In the full-automatic mode, all of the exposure control values can be set automatically by the image pickup apparatus 100, allowing the settable proper exposure to be automatically set in the image pickup apparatus 100.

In step S503, the system control unit 104 determines whether the safety shift mode is the ISO safety shift mode based on the safety shift setting value detected in the processing in step S402. If the system control unit 104 determines that the safety shift mode is the ISO safety shift mode (YES in step S503), the processing proceeds to step S504. In step S504, the system control unit 104 records the currently set ISO sensitivity in the recording unit 115. In step S505, the system control unit 104 changes the ISO sensitivity to obtain the proper exposure.

If the system control unit 104 determines that the safety shift mode is not the ISO safety shift mode (NO in step S503), the processing proceeds to step S506. In step S506, the system control unit 104 stores the currently set shutter speed and aperture value in the recording unit 115. In step S507, the system control unit 104 changes at least one of the shutter speed and the aperture value to obtain the proper exposure. This completes the description of the safety shift processing according to the present exemplary embodiment. If the safety shift OFF mode is set regardless of the determination on the safety shift target when performing the processing in step S503, the system control unit 104 ends the safety shift processing.

Figure 14:
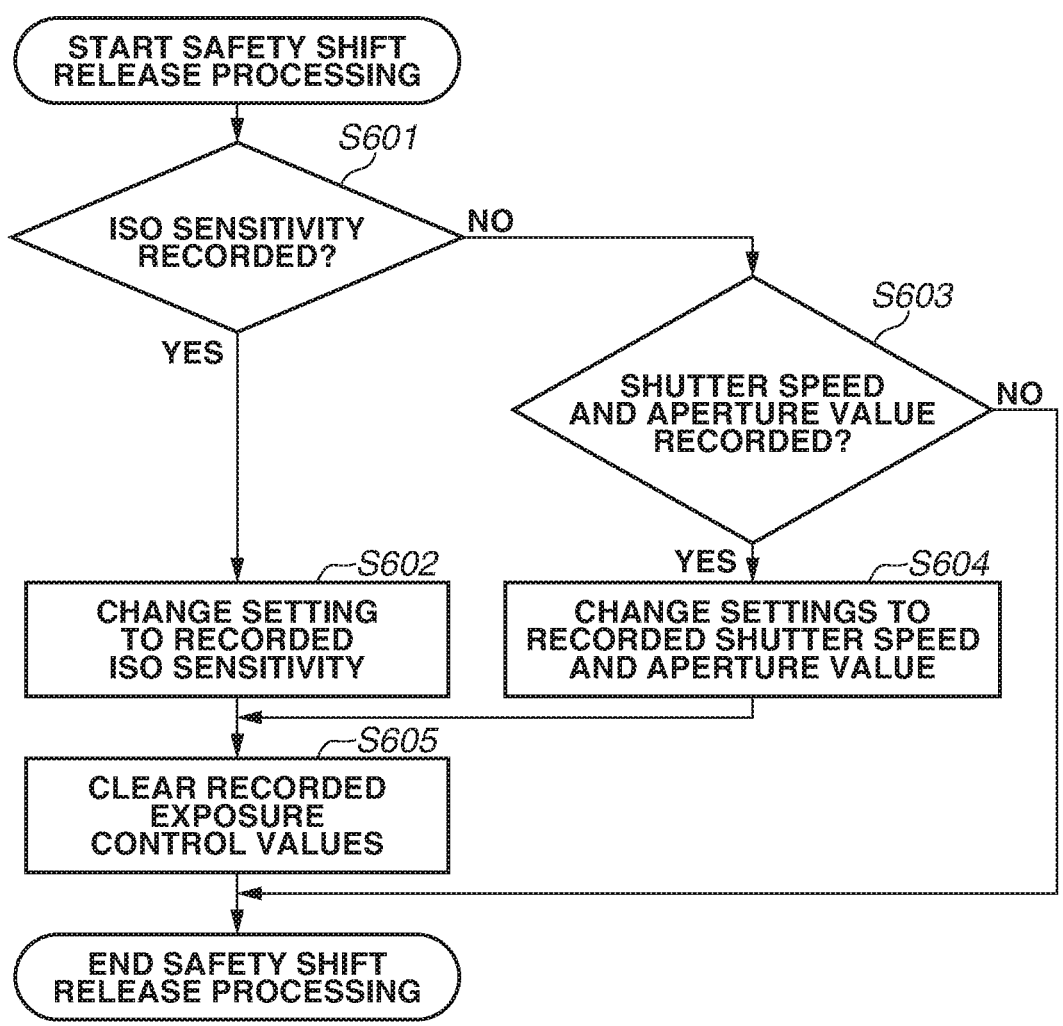
FIG. 14 is a flowchart illustrating safety shift release processing according to an exemplary embodiment of the present invention.

The safety shift release processing will now be described with reference to FIG. 14. FIG. 14 is a flowchart illustrating the safety shift release processing according to an exemplary embodiment of the present invention. When the system control unit 104 proceeds to the safety shift release processing in step S407, then in step S601, the system control unit 104 determines whether the ISO sensitivity is recorded in the processing in step S504. If the system control unit 104 determines that the ISO sensitivity is recorded (YES in step S601), the processing proceeds to step S602. In step S602, the system control unit 104 reads the (latest) ISO sensitivity recorded in the recording unit 115 and sets the ISO sensitivity as a new exposure control value.

If the system control unit 104 determines that the ISO sensitivity is not recorded (NO in step S601), the processing proceeds to step S603. In step S603, the system control unit 104 determines whether the shutter speed and the aperture value were recorded in the processing in step S506. If the system control unit determines that the shutter speed and the aperture value are recorded (YES in step S603), the processing proceeds to S604. In step S604, the system control unit 104 reads the shutter speed or (and) the (latest) aperture value recorded in the recording unit 115 and sets them as new exposure control values. If recorded exposure control values do not exist (if the exposure control values are not recorded) (NO in step S603), the system control unit 104 ends the safety shift release processing. In step S605, the system control unit 104 deletes (clears) the latest exposure control values recorded in the recording unit 115 and then ends the safety shift release processing.

As described above, when the image capturing mode is the semi-automatic mode, the image pickup apparatus 100 according to the present exemplary embodiment does not execute the safety shift function related to exposure control. Therefore, for example, even when the internal image capturing mode in the semi-automatic mode is the shutter-speed priority mode, unlike a case where the actual image capturing mode is the shutter-speed priority mode, the safety shift function is not executed. This prevents the user from feeling strangeness due to the exposure control values intentionally set by the user being changed by the safety shift function, for example, in the semi-automatic and the manual modes.

The first exemplary embodiment has been described above centering on the image pickup apparatus 100 provided with image capturing modes other than the semi-automatic mode. A second exemplary embodiment will be described below centering on a case where the image pickup apparatus 100 is provided with only the semi-automatic mode as an image capturing mode. More specifically, the image pickup apparatus 100 according to the present exemplary embodiment has only one image capturing mode in which the same image capturing conditions can be set for combinations of automatic setting of the exposure control values and the fixed exposure control values manually set. For the image pickup apparatus 100 according to the present exemplary embodiment, configurations and members identical to those of the image pickup apparatus 100 according to the first exemplary embodiment are assigned the same reference numerals, and redundant descriptions thereof will be omitted.

Figure 15A:
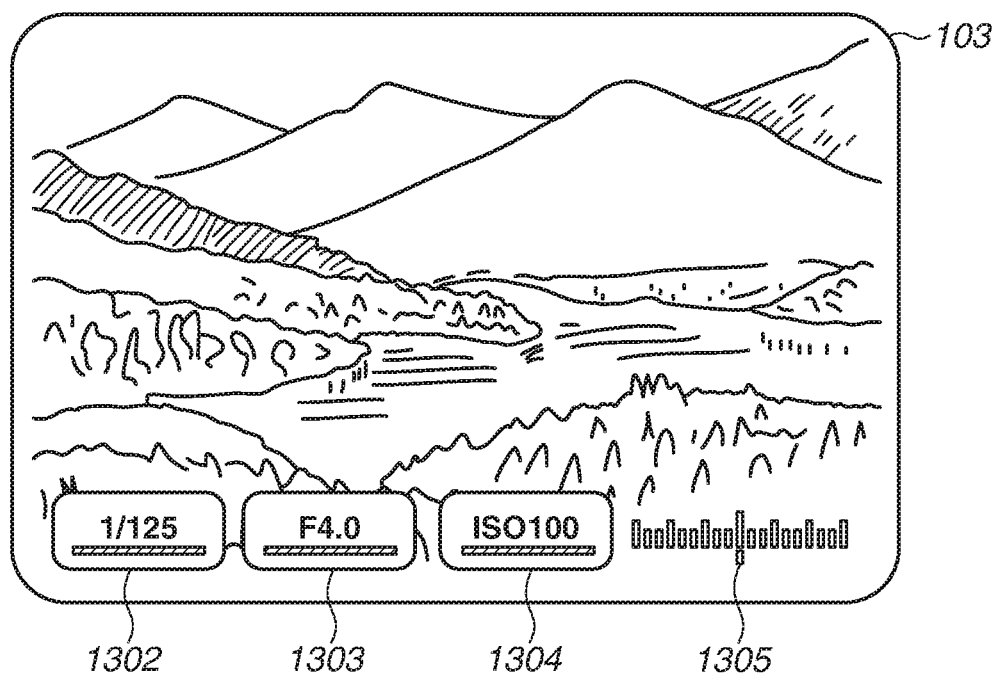
FIGS. 15A and 15B illustrate display examples of exposure control values according to a second exemplary embodiment of the present invention.
Figure 15B:
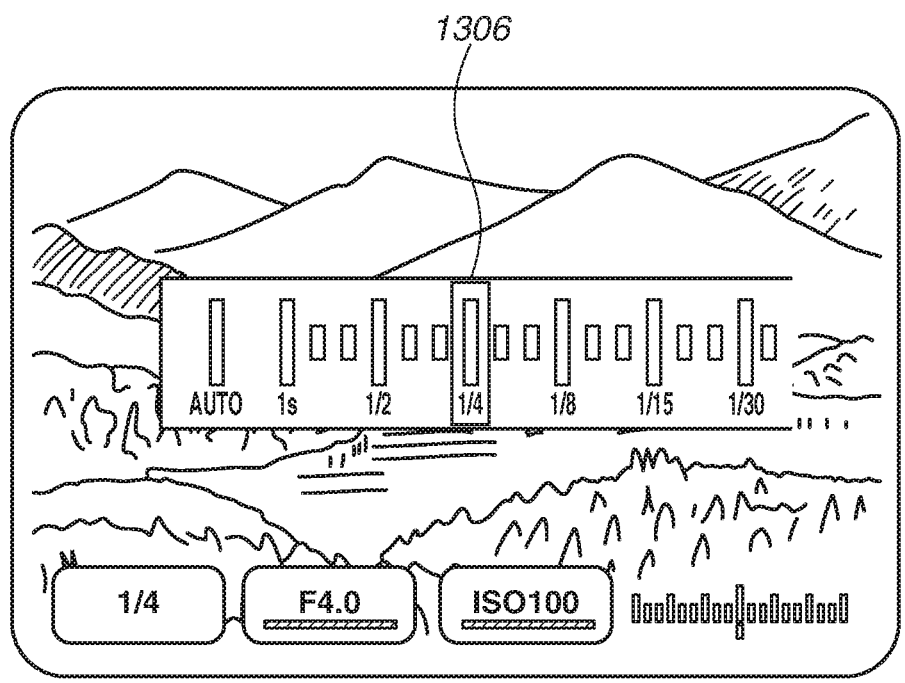

FIGS. 15A and 15B illustrate display examples of the exposure control values according to the second exemplary embodiment of the present invention. FIG. 15A illustrates an example of a GUI including various types of function icons displayed on the display unit 103. FIG. 15B illustrates an example of a state where the shutter speed is set to an arbitrary value.

As illustrated in FIG. 15A, a shutter speed display portion 1302, an aperture value display portion 1303, an ISO sensitivity display portion 1304, and an exposure meter display portion 1305 according to the present exemplary embodiment are provided with the same functions as the function icons (see FIG. 3) according to the above-described first exemplary embodiment. The present exemplary embodiment differs from the above-described first exemplary embodiment in that the function icon corresponding to the image capturing mode display portion 301 is not displayed in the GUI displayed on the display unit 103.

As illustrated in FIG. 15B, when the user selects an arbitrary exposure control value, an exposure determination icon 1306 is newly displayed on the display unit 103 as a function icon for selecting a specific numerical value related to the selection target exposure control value. As illustrated in FIG. 15B, the exposure determination icon 1306 includes predetermined fixed values as user operable input items and an automatic setting item ("AUTO") for an exposure control value to be automatically determined by the image pickup apparatus 100.

Therefore, as a user operation input method related to the GUI display according to the present exemplary embodiment, the user first selects (for example, by touching) the area (function icon) corresponding to an exposure control value to be manually changed through a user manual operation within the GUI displayed on the display unit 103. Then, as a new function icon corresponding to the selected item, the exposure determination icon 1306 is displayed on the display unit 103. The user selects the area corresponding to an arbitrary fixed value or the area corresponding to the automatic setting value in the exposure determination icon 1306. Accordingly, the system control unit 104 changes the exposure control value in the image pickup apparatus 100.

When the user selects the automatic setting value as the exposure control value, the function icon of the corresponding exposure control value is underlined (see FIG. 15A). When the user selects a fixed value as the exposure control value, the function icon is not underlined (see the shutter speed illustrated in FIG. 15B). For example, in a state where a fixed value is set for an arbitrary exposure control value, to change the exposure control value to the automatic setting value by using the above-described method, the user needs to select the icon of the corresponding exposure control value and then perform the operation based on the exposure determination icon 1306.

In this case, the user needs to perform at least two different operations (touch operations), and changing the exposure control value may take time. According to the present exemplary embodiment, when the user operates the reset input unit 113, all of the exposure control values can be reset to the automatic setting values. This configuration enables the image pickup apparatus 100 to enter a state where the exposure control values can be automatically set by the system control unit 104 without requiring complicated operations. Therefore, for example, after temporarily having the exposure control values determined by the image pickup apparatus 100, even when performing an operation for changing an arbitrary exposure control value to a fixed value based on the user's own intention, the user can immediately set the exposure control value according to the user's intention.

In the semi-automatic mode, for the exposure control values set to automatic setting values, the exposure control value to be preferentially changed during exposure control differs according to the combination of fixed and automatic setting values. Table 6 illustrates examples of change priorities of the automatically settable exposure control values in the semi-automatic mode.

Figure 16:
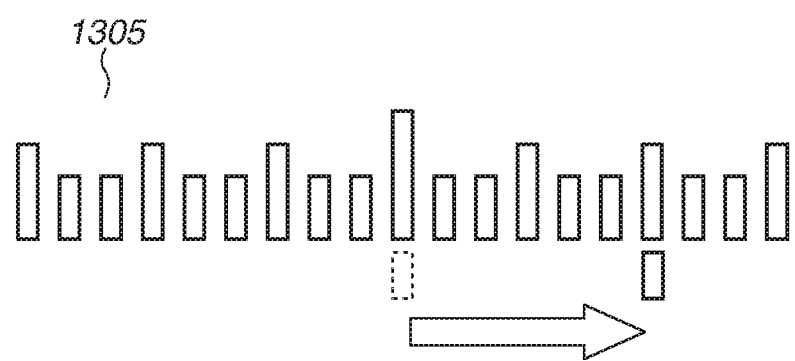
FIG. 16 is an enlarged view illustrating an exposure meter display portion according to the second exemplary embodiment of the present invention.

In the semi-automatic mode, not only each of the exposure control values but also the exposure correction amount can be changed. FIG. 16 is an enlarged view illustrating the exposure meter display portion 1305 according to the second exemplary embodiment of the present invention. As illustrated in FIG. 16, in the semi-automatic mode, when performing exposure correction on an arbitrary exposure correction amount from the reference position, the system control unit 104 determines the exposure control value to be used for exposure correction from among the exposure control values having automatic setting values. Table 7 illustrates examples of change priorities of the exposure correction values to be used for exposure correction in the semi-automatic mode.

As illustrated in Tables 6 and 7, in the semi-automatic mode, if the ISO sensitivity can be automatically set, the system control unit 104 preferentially changes the ISO sensitivity and then the shutter speed in this order. This is because the ISO sensitivity from among exposure control values provides a relatively small change in an image for the user's intention and requires relatively short time to be changed in comparison with a case where a mechanical component such as an aperture is driven. The conditions illustrated in Tables 6 and 7 are to be considered as illustrative. Other exposure control values may be preferentially changed or preferentially used for exposure correction. The conditions illustrated in Tables 6 and 7 are common to the above-described first exemplary embodiment and the present exemplary embodiment.

While the present invention has been specifically described based on the above-described preferred exemplary embodiments, the present invention is not limited thereto but can be modified in diverse ways within the scope of the appended claims. For example, while the above-described exemplary embodiments have been described centering on the shutter speed, the aperture value, and the ISO sensitivity as exposure control values, additional exposure control values related to other elements may also be used. For example, if the image pickup apparatus 100 or the interchangeable lens 200 includes a light attenuation unit for attenuating the light amount incident to the image sensor 101, such as a normal density (ND) filter, the image pickup apparatus 100 may be configured to perform exposure control in consideration of an exposure control value related to the density of the ND filter.

According to the above-described exemplary embodiments, a GUI is displayed on the display unit 103, and, in the semi-automatic mode, the exposure control values are allowed to be freely set in response to an input of a user operation on each function icon in the GUI, the present invention is not limited thereto. For example, the exposure control values are allowed to be set in the semi-automatic mode when the user operates a mechanically operable operation member such as a dial provided on the image pickup apparatus 100.

While the above-described exemplary embodiments are provided with image capturing modes with different settings for the exposure control values, the above-described image capturing conditions equivalent to each image capturing mode are not limited to image capturing conditions settable as a mode. For example, any configuration can be employed as long as the above-described image capturing conditions equivalent to the image capturing modes can be selected or set by the user. More specifically, in a case where the image capturing mode is the manual mode and where an item for setting the ISO sensitivity to a fixed value is provided as a settable menu in addition to the image capturing mode, the image capturing conditions are approximately the same as the image capturing conditions for the ISO-sensitivity priority mode.

More specifically, in the above-described exemplary embodiments, a mode refers to each preset combination of fixed and automatic setting values for the exposure control values from among the image capturing conditions providing different exposure control value settings. In the semi-automatic mode, the user is allowed to arbitrarily set a combination of fixed and automatic setting values and actual fixed values for each of the exposure control values, without collectively changing combinations of fixed and automatic setting values. Further, in the semi-automatic mode, a result of changing the exposure control value settings is referred to as an internal image capturing mode.

In the above-described exemplary embodiments, a display apparatus disposed on one face (mainly on the back face) of the image pickup apparatus 100 is described as the display unit 103. However, the GUI may be displayed in an electronic view finder (EVF) which enables viewing by the user. More specifically, means for displaying various function icons related to the exposure control values is applicable to diverse modifications and alterations.

In the above-described exemplary embodiments, the components of the image pickup apparatus 100 and the interchangeable lens 200, such as the system control unit 104 and the memory 106, operate in a collaborative way to control the overall operations of the image pickup apparatus 100. However, the present invention is not limited thereto. For example, a (computer) program according to each of the above-described flowcharts illustrated in FIGS. 6, 9, and 11 to 14 can be prestored in the memory 106 so that the system control unit 104 including a microcomputer executes the program to control the operations of the image pickup apparatus 100 and the interchangeable lens 200. The program can be in any form such as an object code, a program executed by an interpreter, or script data supplied to an operating system (OS) as long as the program provides programmed functions. A recording medium for supplying the program may be, for example, a hard disk, a magnetic recording medium such as a magnetic tape, and an optical/magnetooptical recording medium.

In the above-described exemplary embodiments, a lens-interchangeable type image pickup apparatus, which includes the image pickup apparatus 100 as a main body of the image pickup apparatus and the interchangeable lens 200 separately formed from the image pickup apparatus 100, is used as an example of an image pickup apparatus according to the present invention. However, the present invention is not limited thereto. For example, the image pickup apparatus according to the present invention can be a lens-integrated type image pickup apparatus in which an image pickup apparatus main body and an imaging lens unit are integrally formed.

While a digital camera is used as an example of an image pickup apparatus according to the present invention in the above-described exemplary embodiments, the present invention is not limited thereto. For example, the present invention is also applicable to a configuration employing an image pickup apparatus other than a digital camera, such as a portable device (a digital camcorder and a smart phone), a wearable terminal, and a security camera.

OTHER EXEMPLARY EMBODIMENTS

The present invention can also be achieved when a program for implementing at least one of the functions according to the above-described exemplary embodiments is supplied to a system or apparatus via a network or storage medium, and at least one processor in a computer of the system or apparatus reads and executes the program. Further, the present invention can also be achieved by a circuit (for example, an application specific integrated circuit (ASIC)) for implementing at least one function.

TABLE 1

Image Capturing Modes and Exposure Control Values

|  | Shutter speed | Aperture value | ISO sensitivity |
|---|---|---|---|
| Shutter speed priority | Fixed | Automatic | Automatic/Fixed |
| Aperture value priority | Automatic | Fixed | Automatic/Fixed |
| ISO sensitivity priority | Automatic | Automatic | Fixed |
| Manual | Fixed | Fixed | Automatic/Fixed |
| Full-automatic | Automatic | Automatic | Automatic |
| Semi-automatic | Automatic/Fixed | Automatic/Fixed | Automatic/Fixed |

TABLE 2

Internal Image Capturing Modes in Semi-automatic Mode and Exposure Control Values

| Shutter speed | Aperture value | ISO sensitivity | Internal image capturing mode |
|---|---|---|---|
| Fixed | Automatic | Automatic | Shutter speed priority |
| Fixed | Automatic | Fixed |  |
| Automatic | Fixed | Automatic | Aperture value priority |
| Automatic | Fixed | Fixed |  |
| Automatic | Automatic | Fixed | ISO sensitivity priority |
| Fixed | Fixed | Automatic | Manual |
| Fixed | Fixed | Fixed |  |

TABLE 3

Exposure Control Value Change Priorities in Exposure Auto Bracketing

|  | Shutter speed | Aperture value | ISO sensitivity |
|---|---|---|---|
| Shutter speed priority | — | 2 | 1 |
| Aperture value priority | 2 | — | 1 |
| ISO sensitivity priority | 1 | 2 | — |
| Manual | 1 | — | — |
| Full-automatic | 2 | 3 | 1 |

TABLE 4

Exposure Control Value Change Priorities in HDR Image Capturing

|  | Shutter speed | Aperture value | ISO sensitivity |
|---|---|---|---|
| Shutter speed priority | — | — | 1 |
| Aperture value priority | 2 | — | 1 |
| ISO sensitivity priority | 1 | — | — |
| Manual | 1 | — | — |
| Full-automatic | 2 | — | 1 |

TABLE 5

Image Capturing Modes and Functions in Light-emission Image Capturing

|  | Automatic light-emission image capturing (○: settable, x: not settable) | Slow synchronous image capturing (○: settable, x: not settable) |
|---|---|---|
| Shutter speed priority | x | x |
| Aperture value priority | x | ○ |

TABLE 5-continued

Image Capturing Modes and Functions in Light-emission Image Capturing

|  | Automatic light-emission image capturing (○: settable, x: not settable) | Slow synchronous image capturing (○: settable, x: not settable) |
|---|---|---|
| ISO sensitivity priority | x | ○ |
| Manual | x | x |
| Full-automatic | ○ | ○ |
| Semi-automatic | x | x |

TABLE 6

Exposure Control Value Settings and Change Priorities

| Shutter speed | Aperture value | ISO sensitivity | Exposure control value priority |
|---|---|---|---|
| Fixed | Automatic | Automatic | 1. ISO sensitivity<br>2. Aperture value |
| Fixed | Automatic | Fixed | — |
| Automatic | Fixed | Automatic | 1. ISO sensitivity<br>2. Shutter speed |
| Automatic | Fixed | Fixed | — |
| Automatic | Automatic | Fixed | 1. ISO sensitivity<br>2. Shutter speed |
| Fixed | Fixed | Fixed | — |

TABLE 7

Exposure Control Value Settings and Exposure Correction Target Change Priorities

| Shutter speed | Aperture value | ISO sensitivity | Exposure correction target |
|---|---|---|---|
| Fixed | Automatic | Automatic | 1. ISO sensitivity<br>2. Aperture value |
| Fixed | Automatic | Fixed | Aperture value |
| Automatic | Fixed | Automatic | 1. Shutter speed<br>2. ISO sensitivity |
| Automatic | Fixed | Fixed | Shutter speed |
| Automatic | Automatic | Fixed | 1. Shutter speed<br>2. Aperture value |
| Fixed | Fixed | Fixed | — |

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments.

This application claims the benefit of Japanese Patent Applications No. 2018-123741, filed Jun. 28, 2018, No. 2018-123742, filed Jun. 28, 2018, No. 2018-123743, filed Jun. 28, 2018, and No. 2019-077388, filed Apr. 15, 2019, which are hereby incorporated by reference herein in their entirety.

What is claimed is:

1. An image pickup apparatus having a plurality of image capturing modes each providing a different method for controlling a plurality of exposure control values to change the exposure when capturing an image of a subject to acquire an image signal, the image pickup apparatus comprising:
   an image pickup unit; and
   at least one processor or circuit configured to perform the operations of the following units:
   a first control unit configured to control transitions between the plurality of image capturing modes actuated by a manual user operation, using a first operation member; and
   a second control unit configured to control changes to the plurality of exposure control values by a manual user operation, using a second operation member,
   wherein the plurality of image capturing modes at least includes a first mode, a second mode, a third mode and a fourth mode,
   wherein the first mode is a mode in which an exposure control value from among the plurality of exposure control values is to be chosen and set to a fixed value by the user, and other exposure control values are set to automatic values settable by the image pickup apparatus without involving a change operation by the user,
   wherein the second mode is a mode in which the plurality of exposure control values is all set to the automatic values,
   wherein the third mode is a mode in which the plurality of exposure control values is settable to a combination of the automatic value and the fixed value settable in the first and the second modes by the user via the second operation member, without changing the image capturing mode,
   wherein the fourth mode is a mode in which all of the plurality of exposure control values are set to the fixed values by the user, and
   wherein, in the third mode, the plurality of exposure control values is settable to the fixed values in response to a user operation, as in the fourth mode.

2. The image pickup apparatus according to claim 1, further comprising a memory configured to store a plurality of exposure conditions under which numerical combinations of the plurality of exposure control values are predetermined according to a luminance value of the subject,
   wherein, in the third mode, for the same combination of the fixed and the automatic values as the combination in the first or the second mode, the same exposure conditions from among the plurality of exposure conditions stored in the memory are used.

3. The image pickup apparatus according to claim 2,
   wherein the exposure conditions are program diagrams, and
   wherein the memory stores program diagrams which are common to the first, the second, and the third modes.

4. The image pickup apparatus according to claim 1, wherein, in the third mode, the automatic values are alterable by user, and any such altered automatic value is set as new fixed value.

5. The image pickup apparatus according to claim 1,
   wherein the image pickup apparatus executes an auto bracketing function of performing image pickup a plurality of times with changed exposure, and
   wherein, when executing the auto bracketing function in the third mode, the second control unit determines an exposure control value to be preferentially changed in the auto bracketing function according to the user-set fixed values.

6. The image pickup apparatus according to claim 1,
   wherein the image pickup apparatus executes a high dynamic range (HDR) image capturing function of acquiring a plurality of images providing different exposures, the plurality of images being used to generate a combined image having an extended dynamic range, and
   wherein, when executing the HDR image capturing function in the third mode, the second control unit determines an exposure control value to be preferentially changed in the HDR image capturing function according to the user-set fixed values.

7. The image pickup apparatus according to claim 1,
   wherein, the image pickup apparatus performs exposure correction for correcting an arbitrary amount of exposure in response to a user operation with respect to a proper exposure as a reference predetermined by the image pickup apparatus, and
   wherein, in the third mode, the second control unit determines an exposure control value to be used for the exposure correction according to the user-set fixed values.

8. The image pickup apparatus according to claim 1,
   wherein the plurality of exposure control values includes at least a shutter speed, an aperture value, and an ISO sensitivity, and
   wherein, in the second and the third modes, a state where only the shutter speed is set to the fixed value, a state where only the aperture value is set to the fixed value, and a state where only the ISO sensitivity is set to the fixed value are settable.

9. The image pickup apparatus according to claim 1, further comprising a display unit configured to display setting items related to the plurality of exposure control values, wherein, in the third mode, for each of the setting items displayed on the display unit, an icon displayed for the same setting item differs between a case where the fixed value is set and a case where the automatic value is set.

10. The image pickup apparatus according to claim 1, further comprising a light emission control unit configured to perform control related to light-emission image capturing using a light emission apparatus connectable with the image pickup unit and the image pickup apparatus, wherein the light emission control unit performs control,
    in the first mode, based on a first combination of the fixed and the automatic values, to perform automatic light emission in which the image pickup apparatus sets light emission to ON or OFF and sets an amount of light emission for the light emission apparatus without involving setting by the user, and in the third mode, not to perform automatic light emission even when the combination of the fixed and the automatic values is the first combination.

11. The image pickup apparatus according to claim 10, wherein, in the first and the third modes, the light emission control unit sets light emission to ON or OFF for the light emission apparatus through a user manual setting.

12. The image pickup apparatus according to claim 10, wherein the light emission control unit performs control, in the first mode, to execute a first function of performing light-emission image capturing so that an accumulation time becomes longer than that in normal light-emission image capturing, and in the third mode, not to execute the first function even when the combination of the plurality of exposure control values is the same as that when executing the first function in the first mode.

13. The image pickup apparatus according to claim 1, wherein, upon setting of the fixed value by the user, the image pickup apparatus executes a shift function of changing predetermined exposure control values without involving a change operation by the user so that the exposure control values provide the proper exposure, and wherein the second control unit performs control, in the first mode, to execute the shift function based on a first combination of the fixed and the automatic values, and in the third mode, not to execute the shift function even when the combination of the fixed and the automatic values is the first combination.

14. The image pickup apparatus according to claim 13, wherein the shift function changes any one of the shutter speed, the aperture value, and the ISO sensitivity as the predetermined exposure control values without involving a change operation by the user so as to provide the proper exposure, and wherein the predetermined exposure control values are pre-settable by the user.

15. An image pickup apparatus including an image pickup unit and having a plurality of image capturing modes each providing a different method for controlling a plurality of exposure control values to change the exposure when capturing an image of a subject to acquire an image signal via the image pickup unit, the image pickup apparatus comprising:

a memory configured to store a plurality of exposure conditions under which numerical combinations of the plurality of exposure control values are predetermined according to a luminance value of the subject; and at least one processor or circuit configured to perform the operations of the following unit:

a control unit configured to control changes to the plurality of exposure control values in response to an input of a user operation, wherein the plurality of image capturing modes at least includes:

a first mode in which an exposure control value from among the plurality of exposure control values is chosen and set to a fixed value by the user, and other exposure control values are set to automatic values settable by the image pickup apparatus without involving a change operation by the user, a second mode in which the plurality of exposure control values is all set to the automatic values, a third mode in which the plurality of exposure control values is settable to the fixed values and the automatic values by the user, and a fourth mode in which all of the plurality of exposure control values are set to the fixed values by the user, wherein, in the third mode different from the first, the second and the fourth modes, a combination of the fixed and the automatic values is changeable without changing the image capturing mode, and wherein, in the third mode, for the same combination of the fixed and the automatic values as those in the first, the second or the fourth mode, the control unit performs control to use the same exposure conditions from among the plurality of exposure conditions stored in the memory.

16. A method for controlling an image pickup apparatus including an image sensor and having a plurality of image capturing modes each providing a different methods for controlling a plurality of exposure control values to change the exposure when capturing an image of a subject to acquire an image signal, the method comprising:

controlling, by first controlling, transitions between the plurality of image capturing modes actuated by a manual user operation, using a first operation member; and controlling, by second controlling, changes to the plurality of exposure control values by a manual user operation using a second operation member, wherein the plurality of image capturing modes at least includes a first mode, a second mode, third mode, and a fourth mode, wherein the first mode is a mode in which an exposure control value from among the plurality of exposure control values is to be chosen and set to a fixed value by the user, and other exposure control values are set to automatic values settable by the image pickup apparatus without involving a change operation by the user, wherein the second mode is a mode in which the plurality of exposure control values is all to be set to the automatic values, wherein the third mode is a mode in which the plurality of exposure control values are settable to a combination of the automatic value and fixed value settable in the first and the second modes by the user via the second operation member, without changing the image capturing mode, wherein the fourth mode is a mode in which all of the plurality of exposure control values are set to the fixed values by the user, and wherein, in the third mode, the plurality of exposure control values is settable to the fixed values in response to a user operation, as in the fourth mode.

17. A method for controlling an image pickup apparatus including an image sensor and a memory configured to store a plurality of exposure conditions under which numerical combinations from among the plurality of exposure control values are predetermined according to a luminance value of a subject, the image pickup apparatus having a plurality of image capturing modes each providing a different method for controlling the plurality of exposure control values to change the exposure when capturing an image of the subject to acquire an image signal, the method comprising:

controlling, by exposure controlling, changes of the plurality of exposure control values in response to an input of a user operation, wherein the plurality of image capturing modes at least includes:
a first mode in which an exposure control value from among the plurality of exposure control values is set to a fixed value by the user, and other exposure control values are set to settable automatic values by the image pickup apparatus without involving a change operation by the user,
a second mode in which the plurality of exposure control values is all set to the automatic values,
a third mode in which the plurality of exposure control values is settable to the fixed values and the automatic values by the user, and
a fourth mode in which all of the plurality of exposure control values are set to the fixed values by the user,
wherein, in the third mode different from the first, the second and the fourth modes, a combination of the fixed and the automatic values is changeable without changing the image capturing mode, and
wherein, in the third mode, for the same combination of the fixed and the automatic values as those in the first, the second or the fourth mode, control is performed in the exposure controlling to use the same exposure conditions from among the plurality of exposure conditions stored in the memory.

18. A non-transitory computer-readable storage medium storing a program for causing a processor to execute a method of controlling an image pickup apparatus that includes an image sensor, the control method comprising:
controlling, by first controlling, transitions between the plurality of image capturing modes actuated by a manual user operation, using a first operation member; and
controlling, by second controlling, changes to the plurality of exposure control values by a manual user operation using a second operation member,
wherein the plurality of image capturing modes at least including a first mode, a second mode, a third mode, and a fourth mode,
wherein the first mode is a mode in which an exposure control value from among the plurality of exposure control values is to be chosen and set to a fixed value by the user, and other exposure control values are set to automatic values settable by the image pickup apparatus without involving a change operation by the user,
wherein the second mode is a mode in which the plurality of exposure control values are all to be set to the automatic values,
wherein the third mode is a mode in which the plurality of exposure control values are settable to a combination of the automatic value and fixed value settable in the first and the second modes by the user via the second operation member, without changing the image capturing mode,
wherein the fourth mode is a mode in which all of the plurality of exposure control values are set to the fixed values by the user, and
wherein, in the third mode, the plurality of exposure control values is settable to the fixed values in response to a user operation, as in the fourth mode.

19. A non-transitory computer-readable storage medium storing a program for causing a processor to execute a method of controlling an image pickup apparatus that includes an image sensor and a memory configured to store a plurality of exposure conditions under which numerical combinations from among the plurality of exposure control values are predetermined according to a luminance value of a subject, the control method comprising:
controlling, by exposure controlling, changes of the plurality of exposure control values in response to an input of a user operation,
wherein the plurality of image capturing modes at least includes:
a first mode in which an exposure control value from among the plurality of exposure control values is set to a fixed value by the user, and other exposure control values are set to settable automatic values by the image pickup apparatus without involving a change operation by the user,
a second mode in which the plurality of exposure control values is all set to the automatic values,
a third mode in which the plurality of exposure control values is settable to the fixed values and the automatic values by the user, and
a fourth mode in which all of the plurality of exposure control values are set to the fixed values by the user,
wherein, in the third mode different from the first, the second, and the fourth modes, a combination of the fixed and the automatic values is changeable without changing the image capturing mode, and
wherein, in the third mode, for the same combination of the fixed and the automatic values as those in the first, the second or the fourth mode, control is performed in the exposure controlling to use the same exposure conditions from among the plurality of exposure conditions stored in the memory.

* * * * *